(12) United States Patent
Noh et al.

(10) Patent No.: US 10,749,996 B2
(45) Date of Patent: Aug. 18, 2020

(54) DOPPLER MODE IN A WIRELESS NETWORK

(71) Applicant: NEWRACOM, INC., Lake Forest, CA (US)

(72) Inventors: Yujin Noh, Irvine, CA (US); Young Hoon Kwon, Laguna Niguel, CA (US)

(73) Assignee: NEWRACOM, INC., Lake Forest, CA (US)

( * ) Notice: Subject to any disclaimer, the term of this patent is extended or adjusted under 35 U.S.C. 154(b) by 98 days.

(21) Appl. No.: 15/978,030

(22) Filed: May 11, 2018

(65) Prior Publication Data

US 2020/0228634 A1 Jul. 16, 2020

Related U.S. Application Data

(60) Provisional application No. 62/511,914, filed on May 26, 2017.

(51) Int. Cl.
| | | |
|---|---|---|
| *H04L 29/06* | (2006.01) | |
| *H04W 74/00* | (2009.01) | |
| *H04L 5/00* | (2006.01) | |
| *H04L 27/26* | (2006.01) | |

(52) U.S. Cl.
CPC ............ *H04L 69/22* (2013.01); *H04L 5/0048* (2013.01); *H04L 27/2613* (2013.01); *H04W 74/006* (2013.01); *H04L 27/261* (2013.01)

(58) Field of Classification Search
CPC ............. H04W 74/006; H04L 27/2613; H04L 5/0048; H04L 27/261; H04L 5/003; H04L 69/22; H04L 69/00

USPC .................................................. 370/252, 254
See application file for complete search history.

(56) References Cited

U.S. PATENT DOCUMENTS

| | | | |
|---|---|---|---|
| 2012/0327871 A1 | 12/2012 | Ghosh et al. | |
| 2013/0279379 A1 | 10/2013 | Yang et al. | |
| 2015/0341197 A1 | 11/2015 | Porat et al. | |
| 2016/0119452 A1* | 4/2016 | Lee .......................... | H04L 69/22 370/338 |
| 2017/0171878 A1* | 6/2017 | Chun ...................... | H04L 27/26 |
| 2018/0146076 A1* | 5/2018 | Verma .................. | H04B 7/0413 |
| 2018/0302256 A1* | 10/2018 | Huang .................... | H04L 27/26 |
| 2018/0309605 A1* | 10/2018 | Liu ...................... | H04L 27/2602 |
| 2019/0260536 A1* | 8/2019 | Ko ......................... | H04L 1/0079 |

OTHER PUBLICATIONS

Hongyuan Zhang, Marvell, et al., "802.11AX Midamble Design for Doppler", doc.: IEEE 802.11-17/0734r1, May 3, 2017, pp. 1-25.
International Search Report for Patent Application No. PCT/US2018/034766, dated Oct. 1, 2018.

(Continued)

*Primary Examiner* — Rownak Islam

(57) ABSTRACT

To receive data in data field of a PHY Protocol Data Unit (PPDU), wherein the data field includes mid-ambles, a number of mid-ambles and a number of data symbols included in the data field is determined. The number of mid-ambles is determined according to information in an HE-SIG-A field of the PPDU, information in an L-SIG field of the PPDU, and one or more predetermined values prescribed by a standard. The number of data symbols may be determined using the number of the mid-ambles, and the data received according to the number of mid-ambles and the number of data symbols.

20 Claims, 12 Drawing Sheets

(56) References Cited

OTHER PUBLICATIONS

Lochan Verma, Qualcomm et al., "Thoughts on Doppler Design in 802.11ax", doc.:IEEE 802.11-17/0773r1, May 9, 2017, pp. 1-10.
Written Opinion of the International Searching Authority for Patent Application No. PCT/US2018/034766, dated Oct. 1, 2018.
"Part 11: Wireless LAN Medium Access Control (MAC) and Physical Layer (PHY) Specifications", IEEE Standards 802.11™-2012 (Revision of IEEE Standard 802.11-2007), Mar. 29, 2012, pp. 1-2695, IEEE (The Institute of Electrical and Electronic Engineers, Inc.), New York, NY, USA.
"Part 11: Wireless LAN Medium Access Control (MAC) and Physical Layer (PHY) Specifications, Amendment 2: Sub 1 GHz License Exempt Operation", IEEE P802.11ah™/D5.0, Mar. 2015, pp. 1-604, IEEE (The Institute of Electrical and Electronic Engineers, Inc.), New York, NY, USA.
"Part 11: Wireless LAN Medium Access Control (MAC) and Physical Layer (PHY) Specifications, Amendment 4: Enhancements for Very High Throughput for Operation in Bands below 6 GHz", IEEE Standards 802.11ac™-2013, 2013, pp. 1-395, IEEE (The Institute of Electrical and Electronic Engineers, Inc.), New York, NY, USA.

* cited by examiner

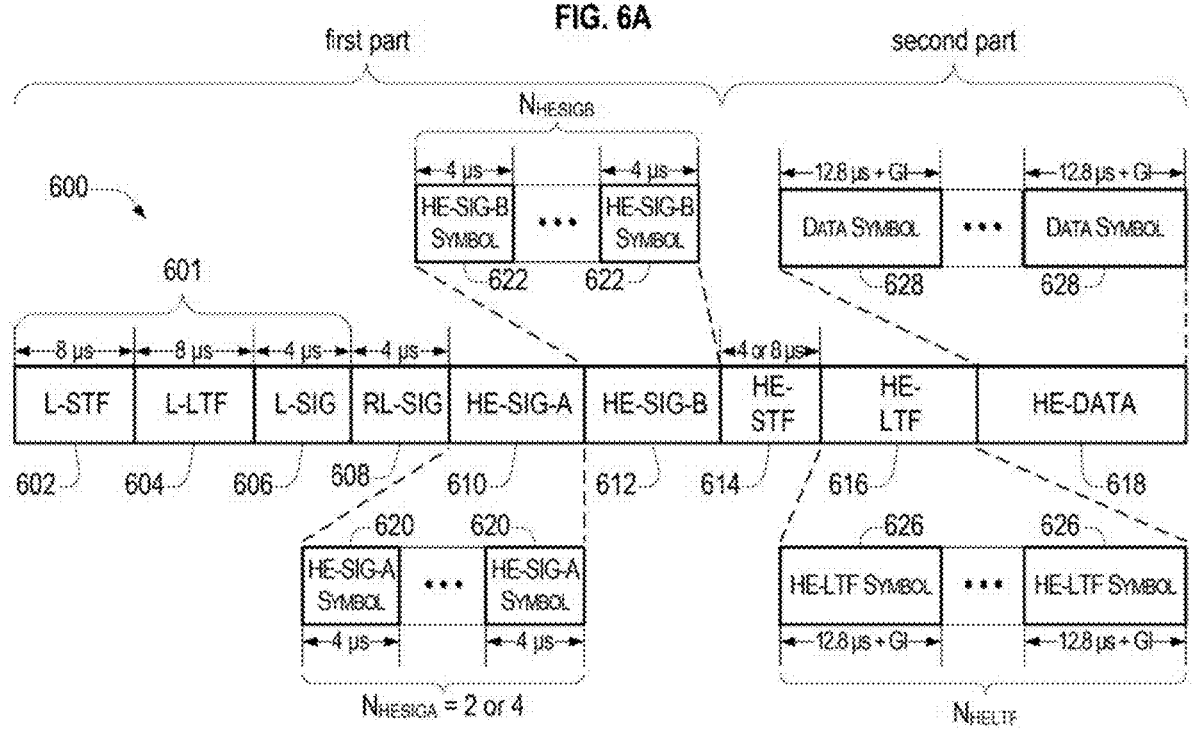

Table 1:

| Element | definition | duration | DFT period | GI | Subcarrier spacing |
|---|---|---|---|---|---|
| L-STF | Non-HT Short Training field | 8 μs | - | - | equiv. to 1,250 kHz |
| L-LTF | Non-HT Long Training field | 8 μs | 3.2 μs | 1.6 μs | 312.5 kHz |
| L-SIG | Non-HT Signal field | 4 μs | 3.2 μs | 0.8 μs | 312.5 kHz |
| RL-SIG | Repeated Non-HT SIGNAL field | 4 μs | 3.2 μs | 0.8 μs | 312.5 kHz |
| HE-SIG-A | HE SIGNAL A field | $N_{HESIGA}$ * 4 μs | 3.2 μs | 0.8 μs | 312.5 kHz |
| HE-SIG-B | HE SIGNAL B field | $N_{HESIGB}$ * 4 μs | 3.2 μs | 0.8 μs | 312.5 kHz |
| HE-STF | HE Short Training field | 4 or 8 μs | - | - | • non-trigger-based PPDU: (equiv. to) 1,250 kHz; • trigger-based PPDU: (equiv. to) 625 kHz |
| HE-LTF | HE Long Training field | $N_{HELTF}$ * (DFT period + GI) μs | 2xLTF: 6.4 μs 4xLTF: 12.8 μs | supports 0.8, 1.6, 3.2 μs | • 2xLTF: 156.25 kHz (equiv.); • 4xLTF: 78.125 kHz |
| HE-DATA | HE DATA field | $N_{DATA}$ * (DFT period + GI) μs | 12.8 μs | supports 0.8, 1.6, 3.2 μs | 78.125 kHz |

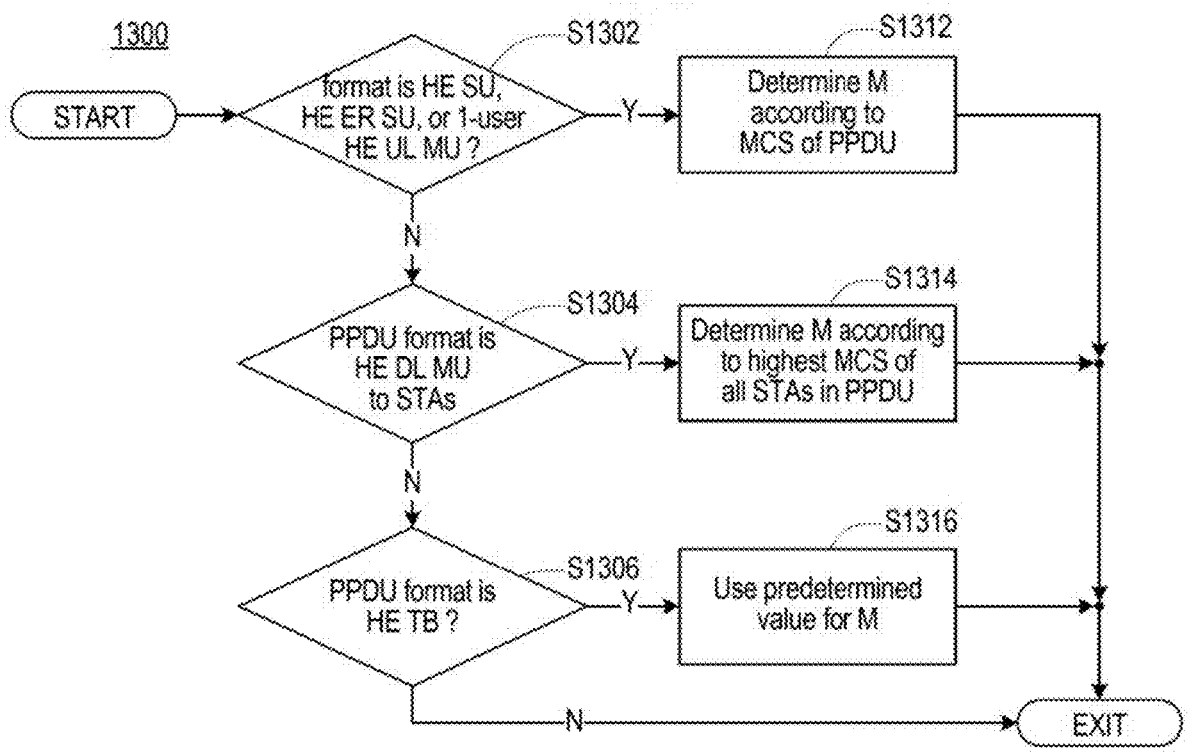
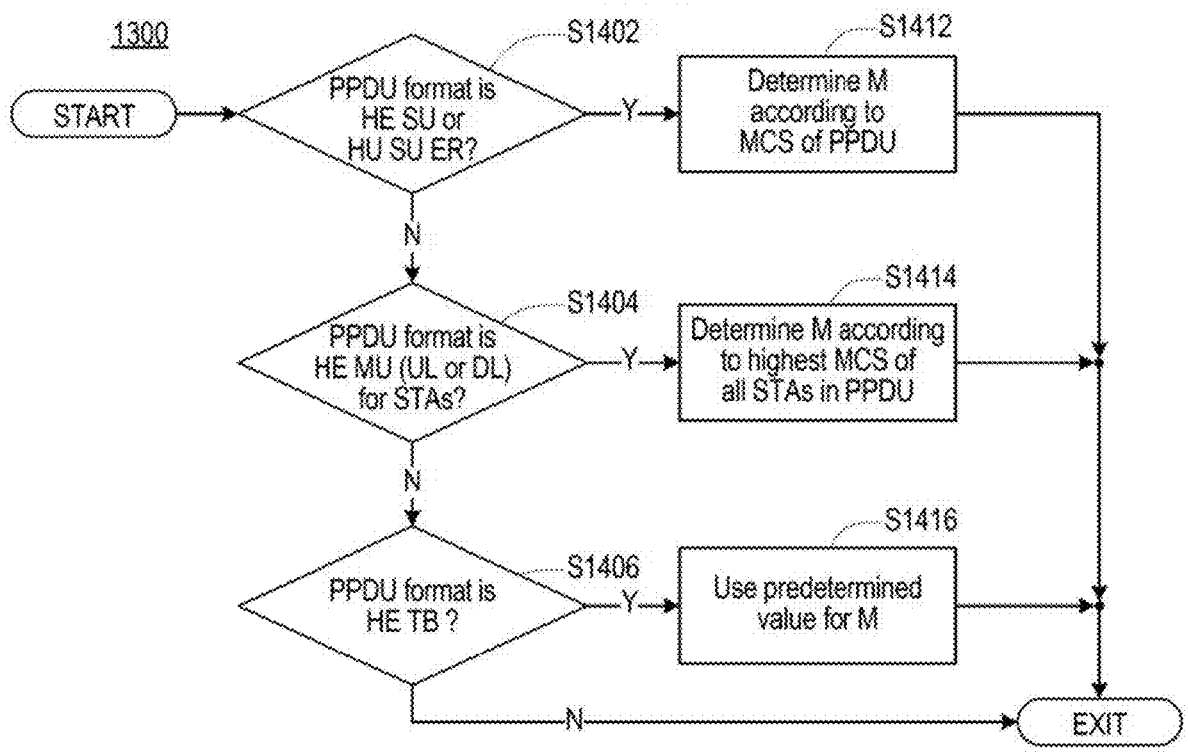

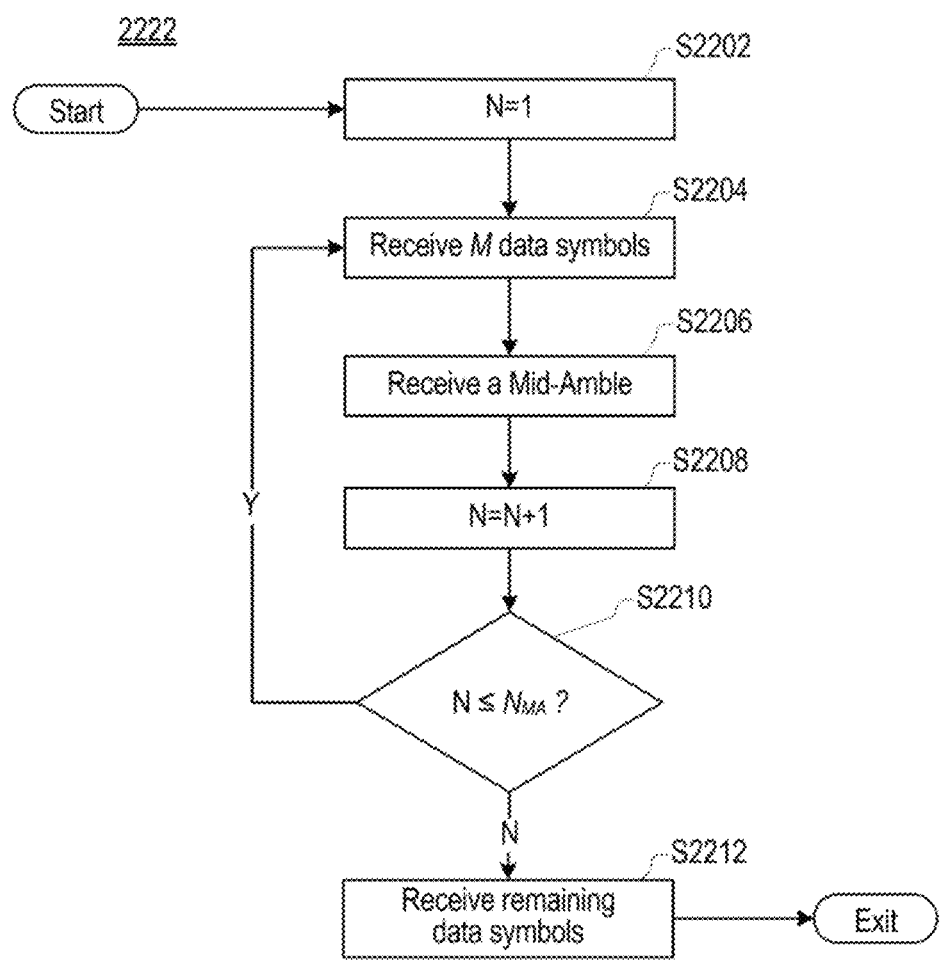

DOPPLER MODE IN A WIRELESS NETWORK

CROSS-REFERENCE TO RELATED APPLICATION

This application claims the benefit of U.S. Provisional Patent Application No. 62/511,914, filed May 26, 2017, which is incorporated by reference herein in its entirety.

BACKGROUND

1. Technical Field

The technology described herein relates generally to wireless networking. More particularly, the technology relates to determining parameters of a received transmission wherein mid-ambles are used to improve the reception of the transmission.

2. Description of the Related Art

Wireless Local Area Network (WLAN) devices are currently being deployed in diverse environments. Some of these environments have large numbers of access points (APs) and non-AP stations in geographically limited areas. In addition, WLAN devices are increasingly required to support a variety of applications such as video, cloud access, and offloading. In particular, video traffic is expected to be the dominant type of traffic in many high efficiency WLAN deployments. With the real-time requirements of some of these applications, WLAN users demand improved performance in delivering their applications, including improved power consumption for battery-operated devices.

A WLAN is being standardized by the IEEE (Institute of Electrical and Electronics Engineers) Part 11 under the name of "Wireless LAN Medium Access Control (MAC) and Physical Layer (PHY) Specifications." A series of standards have been adopted as the WLAN evolved, including IEEE Std 802.11™-2012 (March 2012) (IEEE 802.11n). The IEEE Std 802.11 was subsequently amended by IEEE Std 802.11ae™-2012, IEEE Std 802.11aa™-2012, IEEE Std 802.11ad™-2012, and IEEE Std 802.11ac™-2013 (IEEE 802.11ac).

Recently, an amendment focused on providing a High Efficiency (HE) WLAN in high-density scenarios is being developed by the IEEE 802.11ax task group. The 802.11ax amendment focuses on improving metrics that reflect user experience, such as average per station throughput, the 5th percentile of per station throughput of a group of stations, and area throughput. Improvements may be made to support environments such as wireless corporate offices, outdoor hotspots, dense residential apartments, and stadiums.

In some environments, channel conditions may change during the communication of a data unit. For example, when non-AP stations are moving with respect to the AP, the Doppler effect may alter the channel conditions. In these environments, mid-ambles may be inserted in a data portion of a communication to allow channel estimation to be performed by the receiving device during the reception of the data portion. The presence of mid-ambles into the data portion may alter how the receiving device determines some of the parameters of the communication.

SUMMARY

In an embodiment, a method performed by a wireless device comprises receiving a first portion of a PHY Protocol Data Unit (PPDU), the first portion including a Legacy Signal (L-SIG) field, decoding the L-SIG field, and determining a format of the PPDU using the first portion. In response to determining that the format of the PPDU is a High Efficiency (HE) format, the method performs receiving and decoding an HE Signal A (HE-SIG-A) field, and determining, using a Doppler field of the HE-SIG-A field, whether the PPDU includes mid-ambles. In response to determining that the PPDU includes mid-ambles, the method performs determining, according to the format of the PPDU and using first information determined using the HE-SIG-A field and second information determined using the L-SIG field, a number of mid-ambles $N_{MA}$ indicating the number of mid-ambles included in a data field of the PPDU, determining, using the number of the mid-ambles $N_{MA}$, a number of data symbols $N_{SYM}$ included in the data field of the PPDU, and receiving, using the number of mid-ambles $N_{MA}$ and the number of data symbols $N_{SYM}$, the data field of the PPDU.

In another embodiment, a wireless device comprises a receiver and a processor. The processor is configured to perform receiving, using the receiver, a first portion of a PHY Protocol Data Unit (PPDU), the first portion including a Legacy Signal (L-SIG) field, decoding the L-SIG field, and determining a format of the PPDU using the first portion. The processor is further configure to, in response to determining that the format of the PPDU is a High Efficiency (HE) format, perform receiving and decoding an HE Signal A (HE-SIG-A) field, and determining, using a Doppler field of the HE-SIG-A field, whether the PPDU includes mid-ambles. The processor is further configure to, in response to determining that the PPDU includes mid-ambles, perform determining, according to the format of the PPDU and using first information determined using the HE-SIG-A field and second information determined using the L-SIG field, a number of mid-ambles $N_{MA}$ indicating the number of mid-ambles included in a data field of the PPDU, determining, using the number of the mid-ambles, a number of data symbols $N_{SYM}$ included in the data field of the PPDU, and receiving, using the number of mid-ambles $N_{MA}$ and the number of data symbols $N_{SYM}$, the data field of the PPDU.

In embodiments, the first information includes a Packet Extension (PE) Disambiguity bit value $b_{PE\text{-}Disambiguity}$, a number of HE Long Training Fields (HE-LTFs) value $N_{HE\text{-}LTF}$, an HE-LTF duration including guard interval $T_{HE\text{-}LTF}$, and a data symbol duration $T_{SYM}$, and a mid-amble periodicity M.

In embodiments, the first information further includes a preamble duration $T_{PA}$ according to the format of the PPDU, the HE-LTF duration $T_{HE\text{-}LTF}$, and the number of HE-LTFs value $N_{HE\text{-}LTF}$.

In embodiments, the first information further includes a mid-amble duration $T_{MA}$.

In embodiments, the second information includes a Length field value L_LENGTH.

In embodiments, determining the number of mid-ambles $N_{MA}$ includes determining the number of mid-ambles $N_{MA}$ according to:

$$N_{MA} = \left\lfloor \frac{\frac{L\_LENGTH + m + 3}{3} \times 4 - T_{PA} - T_{SYM}(1 + \beta + b_{PE\text{-}Disambiguity})}{T_{MA} + M \cdot T_{SYM}} \right\rfloor$$

wherein m is 1 when the format of the PPDU is an HE Multi-User PPDU or HE Extended Range Single User PPDU format and m is 2 otherwise, and wherein β is an integer number greater than or equal to zero.

In embodiments, determining the number of mid-ambles $N_{MA}$ includes determining the number of mid-ambles $N_{MA}$ according to:

$$N_{MA} = \left\lceil \frac{\frac{L\_LENGTH + m + 3}{3} \times 4 - T_{PA} - T_{SYM}(1 + \beta + b_{PE\text{-}Disambiguity} + M)}{T_{MA} + M \cdot T_{SYM}} \right\rceil$$

wherein m is 1 when the format of the PPDU is an HE Multi-User PPDU or HE Extended Range Single User PPDU format and m is 2 otherwise, and wherein β is an integer number greater than or equal to zero.

In embodiments, β is 1.

In embodiments, receiving the data field comprises repeating, a number of times equal to the number of mid-ambles $N_{MA}$, the steps of: receiving a plurality of consecutive data symbols, wherein the number of data symbols in the plurality of data symbols is equal to the mid-amble periodicity M, and receiving a mid-amble immediately following the plurality of consecutive data symbols. Then the embodiment receives a remaining 0 or more remaining consecutive data symbols, wherein the number of data symbols $N_{remain}$ is equal to:

$$N_{remain} = N_{SYM} - (M \cdot N_{MA})$$

BRIEF DESCRIPTION OF THE DRAWINGS

FIG. 6A illustrates a High Efficiency (HE) PHY Protocol Data Units (PPDU), according to an embodiment.

FIG. 6B shows a Table 1 disclosing additional properties of fields of the HE PPDU frame of FIG. 6A, according to an embodiment.

FIG. 13 illustrates a process, according to an embodiment, for determining a mid-amble periodicity M according to format of a PPDU.

FIG. 14 illustrates a process, according to another embodiment, for determining a mid-amble periodicity M according to format of a PPDU.

FIG. 22 illustrates a process, according to an embodiment, for receiving a data field of a PPDU including mid-ambles.

DETAILED DESCRIPTION

Figure 1:
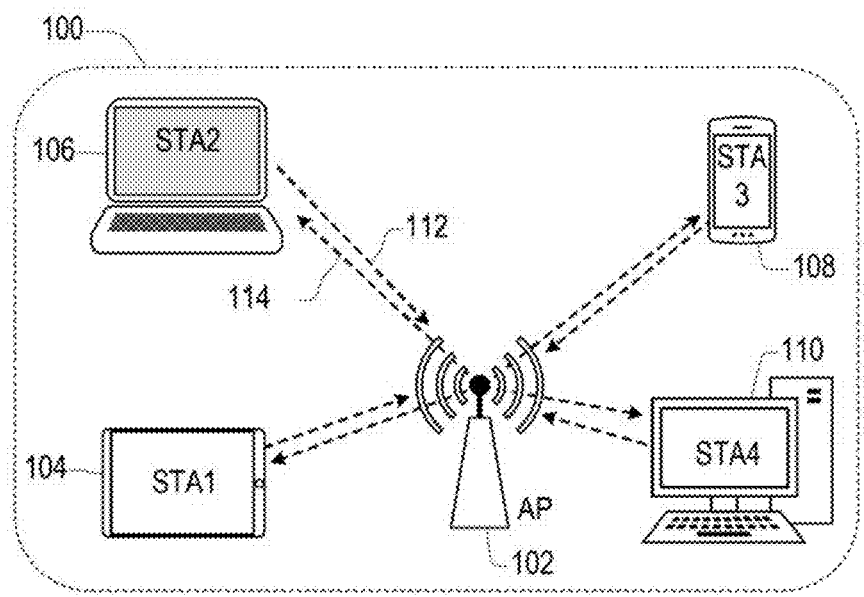
FIG. 1 illustrates a wireless network, according to an embodiment.

The technology described herein relates generally to wireless networking. More particularly, the technology relates to communication of PHY Protocol Data Units (PPDUs) including data fields wherein the data field include mid-ambles.

In the following detailed description, certain illustrative embodiments have been illustrated and described. As those skilled in the art would realize, these embodiments are capable of modification in various different ways without departing from the scope of the present disclosure. Accordingly, the drawings and description are to be regarded as illustrative in nature and not restrictive. Like reference numerals designate like elements in the specification.

FIG. 1 illustrates a wireless network according to an embodiment. The wireless networks includes an infrastructure Basic Service Set (BSS) 100 of a Wireless Local Area Networks (WLAN). In an 802.11 WLAN, the BSS provides the basic organizational unit and typically includes an Access Point (AP) and one or more associated stations (STAs).

The first BSS 100 includes an Access Point 102 (also referred to as AP) wirelessly communicating with first, second, third, and fourth wireless devices (or stations) 104, 106, 108, and 110 (also referred to as stations STA1, STA2, STA3, and STA4, respectively). The wireless devices may each include a medium access control (MAC) layer and a physical (PHY) layer according to an IEEE 802.11 standard.

Although FIG. 1 shows the first BSS 100 including only the first to fourth stations STA1 to STA4, embodiments are not limited thereto and may comprise BSSs including any number of stations.

The AP 102 is a station, that is, a STA, configured to control and coordinate functions of the BSS 100. The AP 102 may transmit information to a single station selected from the plurality of stations STA1 to STA4 in the first BSS 100 using a single frame, or may simultaneously transmit information to two or more of the stations STA1 to STA4 in the first BSS 100 using either a single Orthogonal Frequency Division Multiplexing (OFDM) broadcast frame, a single OFDM Multi-User Multi-Input-Multi-Output (MU-MIMO) transmission, a single Orthogonal Frequency Division Multiple Access (OFDMA) frame, or a single MU-MIMO OFDMA frame.

The stations STA1 to STA4 may each transmit data to the AP 102 using a single frame, or transmit information to and receive information from each other using a single frame. Two or more of the stations STA1 to STA4 may simultaneously transmit data to the AP 102 using an Uplink (UL) OFDMA frame, an UL MU-MIMO frame, or an UL MU-MIMO OFDMA frame.

In another embodiment, the AP 102 may be absent and the stations STA1 to STA4 may be in an ad-hoc network.

FIG. 1 shows a first Down-Link (DL) transmission 114 and a first Up-Link (UL) transmission 112 of the first BSS 100.

Each of the stations STA1 to STA4 and the AP 102 includes a processor and one or more transceiver circuits, and may further include a user interface and a display device.

The processor is configured to generate a frame to be transmitted through a wireless network, to process a frame received through the wireless network, and to execute protocols of the wireless network. The processor may perform some or all of its functions by executing computer programming instructions stored on a non-transitory computer-readable medium.

The transceiver represents a unit functionally connected to the processor, and designed to transmit and receive a frame through the wireless network. The transceiver may include a single component that performs the functions of transmitting and receiving, or two separate components each performing one of such functions.

The processor and transceiver of the stations STA1 to STA4 and the AP 102 may be respectively implemented using hardware components, software components, or both.

The first AP 102 may be or include a WLAN router, a stand-alone Access Point, a WLAN bridge, a Light-Weight Access Point (LWAP) managed by a WLAN controller, and the like. In addition, a device such as a personal computer, tablet computer, or cellular phone may configured to be able to operate as the AP 102, such as when a cellular phone is configured to operate as a wireless "hot spot."

Each of the stations STA1 to STA4 may be or may include a desktop computer, a laptop computer, a tablet PC, a wireless phone, a mobile phone, a smart phone, an e-book reader, a Portable Multimedia Player (PMP), a portable game console, a navigation system, a digital camera, a Digital Multimedia Broadcasting (DMB) player, a digital audio recorder, a digital audio player, a digital picture recorder, a digital picture player, a digital video recorder, a digital video player, and the like.

The present disclosure may be applied to WLAN systems according to IEEE 802.11 standards but embodiments are not limited thereto.

In IEEE 802.11 standards, frames exchanged between stations (including access points) are classified into management frames, control frames, and data frames. A management frame may be a frame used for exchanging management information that is not forwarded to a higher layer of a communication protocol stack. A control frame may be a frame used for controlling access to a medium. A data frame may be a frame used for transmitting data to be forwarded to the higher layer of the communication protocol stack.

A type and subtype of a frame may be identified using a type field and/or a subtype field included in a control field of the frame, as prescribed in the applicable standard.

Figure 2:
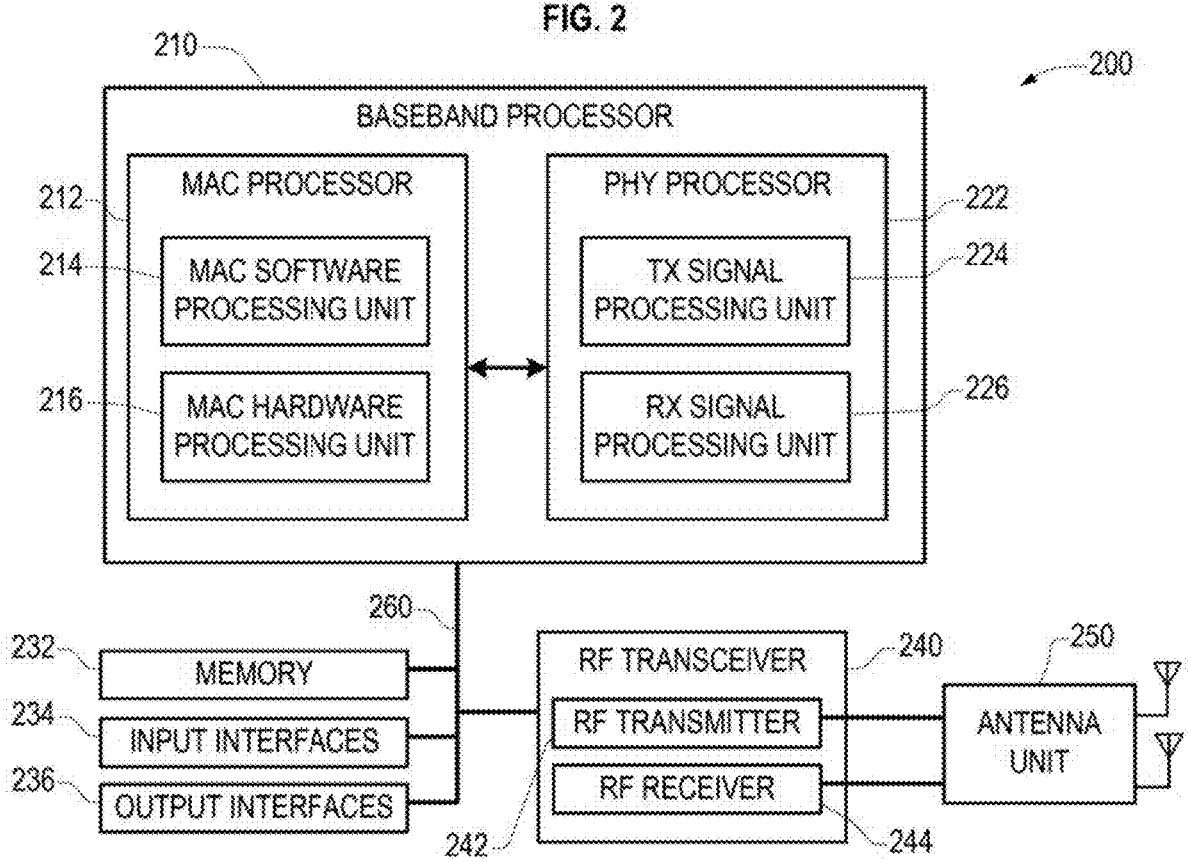
FIG. 2 is a schematic diagram of a wireless device, according to an embodiment.

FIG. 2 illustrates a schematic block diagram of a wireless device 200 according to an embodiment. The wireless or WLAN device 200 may be included in the AP 102 or any of the stations STA1 to STA4 in FIG. 1. The WLAN device 200 includes a baseband processor 210, a radio frequency (RF) transceiver 240, an antenna unit 250, a storage device (e.g., memory) 232, one or more input interfaces 234, and one or more output interfaces 236. The baseband processor 210, the memory 232, the input interfaces 234, the output interfaces 236, and the RF transceiver 240 may communicate with each other via a bus 260.

The baseband processor 210 performs baseband signal processing, and includes a MAC processor 212 and a PHY processor 222. The baseband processor 210 may utilize the memory 232, which may include a non-transitory computer readable medium having software (e.g., computer programming instructions) and data stored therein.

In an embodiment, the MAC processor 212 includes a MAC software processing unit 214 and a MAC hardware processing unit 216. The MAC software processing unit 214 may implement a first plurality of functions of the MAC layer by executing MAC software, which may be included in the software stored in the memory 232. The MAC hardware processing unit 216 may implement a second plurality of functions of the MAC layer in special-purpose hardware. However, the MAC processor 212 is not limited thereto. For example, the MAC processor 212 may be configured to perform the first and second plurality of functions entirely in software or entirely in hardware according to an implementation.

The PHY processor 222 includes a transmitting signal processing unit (SPU) 224 and a receiving SPU 226. The PHY processor 222 implements a plurality of functions of the PHY layer. These functions may be performed in software, hardware, or a combination thereof according to an implementation.

Functions performed by the transmitting SPU 224 may include one or more of Forward Error Correction (FEC) encoding, stream parsing into one or more spatial streams, diversity encoding of the spatial streams into a plurality of space-time streams, spatial mapping of the space-time streams to transmit chains, inverse Fourier Transform (iFT) computation, Cyclic Prefix (CP) insertion to create a Guard Interval (GI), and the like. Functions performed by the receiving SPU 226 may include inverses of the functions performed by the transmitting SPU 224, such as GI removal, Fourier Transform computation, and the like.

The RF transceiver 240 includes an RF transmitter 242 and an RF receiver 244. The RF transceiver 240 is configured to transmit first information received from the baseband processor 210 to the WLAN, and provide second information received from the WLAN to the baseband processor 210.

The antenna unit 250 includes one or more antennas. When Multiple-Input Multiple-Output (MIMO) or Multi-User MIMO (MU-MIMO) is used, the antenna unit 250 may include a plurality of antennas. In an embodiment, the antennas in the antenna unit 250 may operate as a beam-formed antenna array. In an embodiment, the antennas in the antenna unit 250 may be directional antennas, which may be fixed or steerable.

The input interfaces 234 receive information from a user, and the output interfaces 236 output information to the user. The input interfaces 234 may include one or more of a keyboard, keypad, mouse, touchscreen, microphone, and the like. The output interfaces 236 may include one or more of a display device, touch screen, speaker, and the like.

As described herein, many functions of the WLAN device 200 may be implemented in either hardware or software. Which functions are implemented in software and which functions are implemented in hardware will vary according to constraints imposed on a design. The constraints may include one or more of design cost, manufacturing cost, time to market, power consumption, available semiconductor technology, and so on.

As described herein, a wide variety of electronic devices, circuits, firmware, software, and combinations thereof may be used to implement the functions of the components of the WLAN device 200. Furthermore, the WLAN device 200 may include other components, such as application processors, storage interfaces, clock generator circuits, power supply circuits, and the like, which have been omitted in the interest of brevity.

Figure 3A:
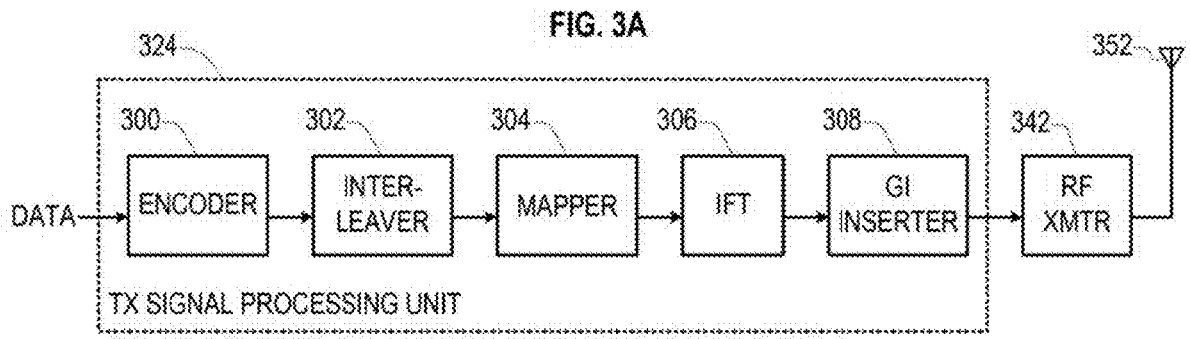
FIG. 3A illustrates components of a wireless device configured to transmit data, according to an embodiment.

FIG. 3A illustrates components of a wireless device configured to transmit data according to an embodiment, including a Transmitting (Tx) SPU (TxSP) 324, an RF transmitter 342, and an antenna 352. In an embodiment, the TxSP 324, the RF transmitter 342, and the antenna 352 correspond to the transmitting SPU 224, the RF transmitter 242, and an antenna of the antenna unit 250 of FIG. 2, respectively.

The TxSP 324 includes an encoder 300, an interleaver 302, a mapper 304, an inverse Fourier transformer (IFT) 306, and a guard interval (GI) inserter 308.

The encoder 300 receives and encodes input data DATA. In an embodiment, the encoder 300 includes a forward error correction (FEC) encoder. The FEC encoder may include a binary convolutional code (BCC) encoder followed by a puncturing device. The FEC encoder may include a low-density parity-check (LDPC) encoder.

The TxSP 324 may further include a scrambler for scrambling the input data before the encoding is performed by the encoder 300 to reduce the probability of long sequences of 0s or 1s. When the encoder 300 performs the BCC encoding, the TxSP 324 may further include an encoder parser for demultiplexing the scrambled bits among a plurality of BCC encoders. If LDPC encoding is used in the encoder, the TxSP 324 may not use the encoder parser.

The interleaver 302 interleaves the bits of each stream output from the encoder 300 to change an order of bits therein. The interleaver 302 may apply the interleaving only when the encoder 300 performs the BCC encoding, and otherwise may output the stream output from the encoder 300 without changing the order of the bits therein.

The mapper 304 maps the sequence of bits output from the interleaver 302 to constellation points. If the encoder 300 performed LDPC encoding, the mapper 304 may also perform LDPC tone mapping in addition to the constellation mapping.

When the TxSP 324 performs a MIMO or MU-MIMO transmission, the TxSP 324 may include a plurality of interleavers 302 and a plurality of mappers 304 according to a number of spatial streams (NSS) of the transmission. The TxSP 324 may further include a stream parser for dividing the output of the encoder 300 into blocks and may respectively send the blocks to different interleavers 302 or mappers 304. The TxSP 324 may further include a space-time block code (STBC) encoder for spreading the constellation points from the spatial streams into a number of space-time streams (NSTS) and a spatial mapper for mapping the space-time streams to transmit chains. The spatial mapper may use direct mapping, spatial expansion, or beamforming.

The IFT 306 converts a block of the constellation points output from the mapper 304 (or, when MIMO or MU-MIMO is performed, the spatial mapper) to a time domain block (i.e., a symbol) by using an inverse discrete Fourier transform (IDFT) or an inverse fast Fourier transform (IFFT). If the STBC encoder and the spatial mapper are used, the IFT 306 may be provided for each transmit chain.

When the TxSP 324 performs a MIMO or MU-MIMO transmission, the TxSP 324 may insert cyclic shift diversities (CSDs) to prevent unintentional beamforming. The TxSP 324 may perform the insertion of the CSD before or after the IFT 306. The CSD may be specified per transmit chain or may be specified per space-time stream. Alternatively, the CSD may be applied as a part of the spatial mapper.

When the TxSP 324 performs a MIMO or MU-MIMO transmission, some blocks before the spatial mapper may be provided for each user.

The GI inserter 308 prepends a GI to each symbol produced by the IFT 306. Each GI may include a Cyclic Prefix (CP) corresponding to a repeated portion of the end of the symbol that the GI precedes. The TxSP 324 may optionally perform windowing to smooth edges of each symbol after inserting the GI.

The RF transmitter 342 converts the symbols into an RF signal and transmits the RF signal via the antenna 352. When the TxSP 324 performs a MIMO or MU-MIMO transmission, the GI inserter 308 and the RF transmitter 342 may be provided for each transmit chain.

Figure 3B:
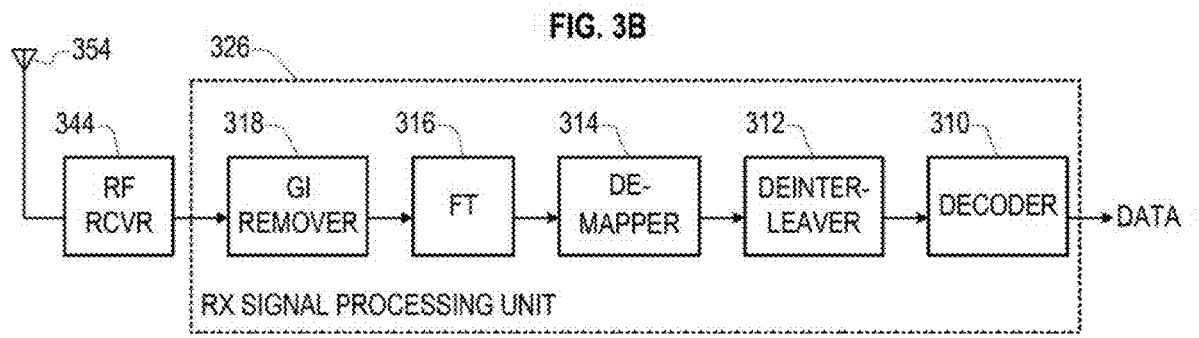
FIG. 3B illustrates components of a wireless device configured to receive data, according to an embodiment.

FIG. 3B illustrates components of a wireless device configured to receive data according to an embodiment, including a Receiver (Rx) SPU (RxSP) 326, an RF receiver 344, and an antenna 354. In an embodiment, the RxSP 326, RF receiver 344, and antenna 354 may correspond to the receiving SPU 226, the RF receiver 244, and an antenna of the antenna unit 250 of FIG. 2, respectively.

The RxSP 326 includes a GI remover 318, a Fourier transformer (FT) 316, a demapper 314, a deinterleaver 312, and a decoder 310.

The RF receiver 344 receives an RF signal via the antenna 354 and converts the RF signal into symbols. The GI remover 318 removes the GI from each of the symbols. When the received transmission is a MIMO or MU-MIMO transmission, the RF receiver 344 and the GI remover 318 may be provided for each receive chain.

The FT 316 converts each symbol (that is, each time domain block) into a frequency domain block of constellation points by using a discrete Fourier transform (DFT) or a fast Fourier transform (FFT). The FT 316 may be provided for each receive chain.

When the received transmission is the MIMO or MU-MIMO transmission, the RxSP 326 may include a spatial demapper for converting the respective outputs of the FTs 316 of the receiver chains to constellation points of a plurality of space-time streams, and an STBC decoder for despreading the constellation points from the space-time streams into one or more spatial streams.

The demapper 314 demaps the constellation points output from the FT 316 or the STBC decoder to bit streams. If the received transmission was encoded using the LDPC encoding, the demapper 314 may further perform LDPC tone demapping before performing the constellation demapping.

The deinterleaver 312 deinterleaves the bits of each stream output from the demapper 314. The deinterleaver 312 may perform the deinterleaving only when the received transmission was encoded using the BCC encoding, and otherwise may output the stream output by the demapper 314 without performing deinterleaving.

When the received transmission is the MIMO or MU-MIMO transmission, the RxSP 326 may use a plurality of demappers 314 and a plurality of deinterleavers 312 corresponding to the number of spatial streams of the transmission. In this case, the RxSP 326 may further include a stream deparser for combining the streams output from the deinterleavers 312.

The decoder 310 decodes the streams output from the deinterleaver 312 or the stream deparser. In an embodiment, the decoder 312 includes an FEC decoder. The FEC decoder may include a BCC decoder or an LDPC decoder.

The RxSP 326 may further include a descrambler for descrambling the decoded data. When the decoder 310 performs the BCC decoding, the RxSP 326 may further include an encoder deparser for multiplexing the data decoded by a plurality of BCC decoders. When the decoder 310 performs the LDPC decoding, the RxSP 326 may not use the encoder deparser.

Before making a transmission, wireless devices such as wireless device 200 will assess the availability of the wireless medium using Clear Channel Assessment (CCA). If the medium is occupied, CCA may determine that it is busy, while if the medium is available, CCA determines that it is idle.

The PHY entity for IEEE Std 802.11 is based on Orthogonal Frequency Division Multiplexing (OFDM) or Orthogonal Frequency Division Multiple Access (OFDMA). In either OFDM or OFDMA Physical (PHY) layers, a STA is capable of transmitting and receiving Physical Layer Protocol Data Units (PPDUs) that are compliant with the mandatory PHY specifications. A PHY specification defines a set of Modulation and Coding Schemes (MCS) and a maximum number of spatial streams. Some PHY entities define downlink (DL) and uplink (UL) Multi-User (MU) transmissions having a maximum number of space-time streams (STS) per user and employing up to a predetermined total number of STSs.

Figure 4:
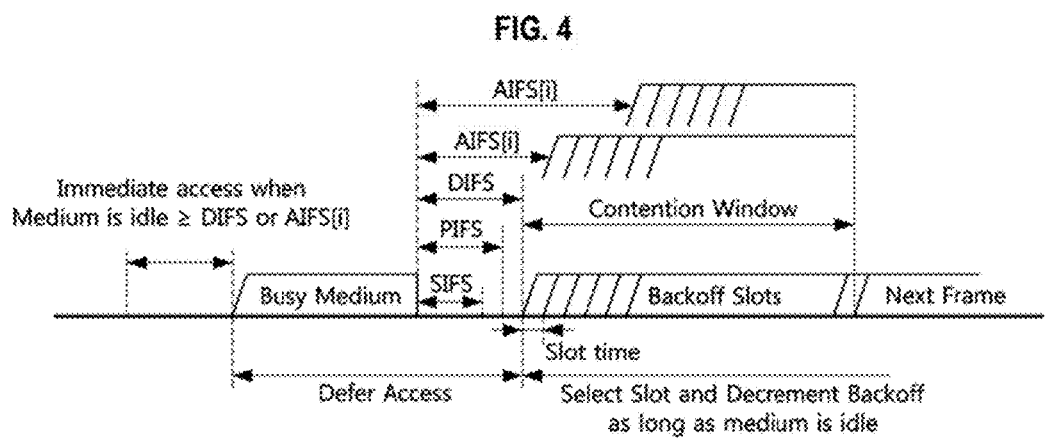
FIG. 4 illustrates Inter-Frame Space (IFS) relationships.

FIG. 4 illustrates Inter-Frame Space (IFS) relationships. FIG. 4 illustrates a Short IFS (SIFS), a Point Coordination Function (PCF) IFS (PIFS), a Distributed Coordination Function (DCF) IFS (DIFS), and an Arbitration IFSs corresponding to an Access Category (AC) 'i' (AIFS[i]). FIG. 4 also illustrates a slot time.

A data frame is used for transmission of data forwarded to a higher layer. The WLAN device transmits the data frame after performing backoff if a DIFS has elapsed during which DIFS the medium has been idle.

A management frame is used for exchanging management information, which is not forwarded to the higher layer. Subtype frames of the management frame include a beacon frame, an association request/response frame, a probe request/response frame, and an authentication request/response frame.

A control frame is used for controlling access to the medium. Subtype frames of the control frame include a request to send (RTS) frame, a clear to send (CTS) frame, and an acknowledgement (ACK) frame.

When the control frame is not a response frame of another frame, the WLAN device transmits the control frame after performing backoff if a DIFS has elapsed during which DIFS the medium has been idle. When the control frame is the response frame of another frame, the WLAN device transmits the control frame after a SIFS has elapsed without performing backoff or checking whether the medium is idle.

A WLAN device that supports a Quality of Service (QoS) functionality (that is, a QoS station) may transmit the frame after performing backoff if an AIFS for an associated access category (AC), (AIFS[AC]), has elapsed. When transmitted by the QoS station, any of the data frame, the management frame, and the control frame which is not the response frame may use the AIFS[AC] of the AC of the transmitted frame.

A WLAN device may perform a backoff procedure when the WLAN device that is ready to transfer a frame finds the medium busy. In addition, a WLAN device operating according to the IEEE 802.11n and 802.11ac standards may perform the backoff procedure when the WLAN device infers that a transmission of a frame by the WLAN device has failed.

The backoff procedure includes determining a random backoff time composed of N backoff slots, each backoff slot having a duration equal to a slot time and N being an integer number greater than or equal to zero. The backoff time may be determined according to a length of a Contention Window (CW). In an embodiment, the backoff time may be determined according to an AC of the frame. All backoff slots occur following a DIFS or Extended IFS (EIFS) period during which the medium is determined to be idle for the duration of the period.

When the WLAN device detects no medium activity for the duration of a particular backoff slot, the backoff procedure shall decrement the backoff time by the slot time. When the WLAN determines that the medium is busy during a backoff slot, the backoff procedure is suspended until the medium is again determined to be idle for the duration of a DIFS or EIFS period. The WLAN device may perform transmission or retransmission of the frame when the backoff timer reaches zero.

The backoff procedure operates so that when multiple WLAN devices are deferring and execute the backoff procedure, each WLAN device may select a backoff time using a random function, and the WLAN device selecting the smallest backoff time may win the contention, reducing the probability of a collision.

Figure 5:
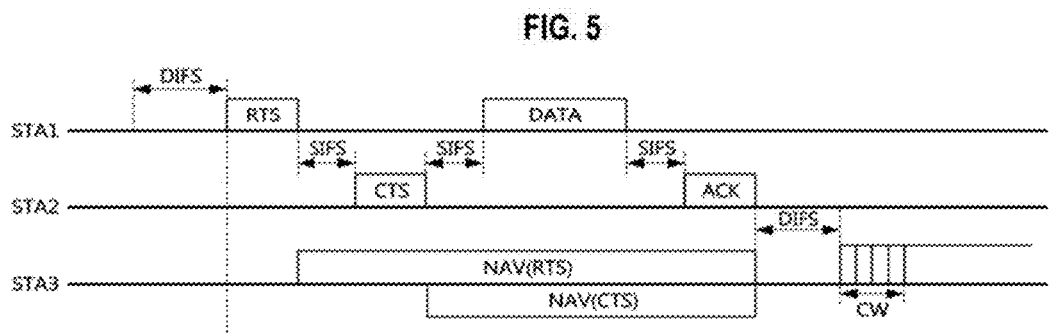
FIG. 5 illustrates a Carrier Sense Multiple Access/Collision Avoidance (CSMA/CA) based frame transmission procedure.

FIG. 5 illustrates a Carrier Sense Multiple Access/Collision Avoidance (CSMA/CA) based frame transmission procedure for avoiding collision between frames in a channel according to an embodiment. FIG. 5 shows a first station STA1 transmitting data, a second station STA2 receiving the data, and a third station STA3 that may be located in an area where a frame transmitted from the STA1, a frame transmitted from the second station STA2, or both can be received. The stations STA1, STA2, and STA3 may be WLAN devices.

The STA1 may determine whether the channel is busy by carrier sensing. The STA1 may determine the channel occupation based on an energy level in the channel or an autocorrelation of signals in the channel, or may determine the channel occupation by using a network allocation vector (NAV) timer.

After determining that the channel is not used by other devices (that is, that the channel is IDLE) during a DIFS (and performing backoff if required), the STA1 may transmit a Ready-To-Send (RTS) frame to the second station STA2. Upon receiving the RTS frame, after a SIFS the second station STA2 may transmit a Clear-To-Send (CTS) frame as a response of the RTS frame. If Dual-CTS is enabled and the second station STA2 is an AP, the AP may send two CTS frames in response to the RTS frame: a first CTS frame in the legacy non-HT format, and a second CTS frame in the HT format.

When the third station STA3 receives the RTS frame, it may set a NAV timer of the third station STA3 for a transmission duration of subsequently transmitted frames (for example, a duration of SIFS+CTS frame duration+SIFS+data frame duration+SIFS+ACK frame duration) using duration information included in the RTS frame. When the third station STA3 receives the CTS frame, it may set the NAV timer of the third station STA3 for a transmission duration of subsequently transmitted frames using duration information included in the CTS frame. Upon receiving a new frame before the NAV timer expires, the third station STA3 may update the NAV timer of the third station STA3 by using duration information included in the new frame. The third station STA3 does not attempt to access the channel until the NAV timer expires.

When the STA1 receives the CTS frame from the second station STA2, it may transmit a data frame to the second station STA2 after SIFS elapses from a time when the CTS frame has been completely received. Upon successfully receiving the data frame, the second station STA2 may transmit an ACK frame as a response of the data frame after SIFS elapses.

When the NAV timer expires, the third station STA3 may determine whether the channel is busy using the carrier sensing. Upon determining that the channel is not used by other devices during a DIFS after the NAV timer has expired, the third station STA3 may attempt to access the channel after a contention window according to a backoff process elapses.

When Dual-CTS is enabled, a station that has obtained a transmission opportunity (TXOP) and that has no data to transmit may transmit a CF-End frame to cut short the TXOP. An AP receiving a CF-End frame having a Basic Service Set Identifier (BSSID) of the AP as a destination address may respond by transmitting two more CF-End frames: a first CF-End frame using Space Time Block Coding (STBC) and a second CF-End frame using non-STBC. A station receiving a CF-End frame resets its NAV timer to 0 at the end of the PPDU containing the CF-End frame.

FIG. 5 shows the second station STA2 transmitting an ACK frame to acknowledge the successful reception of a frame by the recipient.

The PHY entity for IEEE Std 802.11 is based on Orthogonal Frequency Division Multiplexing (OFDM) or Orthogonal Frequency Division Multiple Access (OFDMA). In either OFDM or OFDMA Physical (PHY) layers, a STA is capable of transmitting and receiving PHY Protocol Data Units (PPDUs) that are compliant with the mandatory PHY specifications.

A PHY entity may provide support for 20 MHz, 40 MHz, 80 MHz, and 160 MHz contiguous channel widths and support for an 80+80 MHz non-contiguous channel width. Each channel includes a plurality of subcarriers, which may also be referred to as tones.

A PHY entity may define fields denoted as Legacy Signal (L-SIG), Signal A (SIG-A), and Signal B (SIG-B) within which some necessary information about PHY Service Data Unit (PSDU) attributes are communicated. For example, a High Efficiency (HE) PHY entity may define an L-SIG field, an HE Signal A (HE-SIG-A) field, and an HE Signal B (HE-SIG-B) field.

The descriptions below, for sake of completeness and brevity, refer to OFDM-based 802.11 technology. Unless otherwise indicated, a station refers to a non-AP HE STA, and an AP refers to an HE AP.

In the IEEE Std 802.11ac, SIG-A and SIG-B fields are called VHT SIG-A and VHT SIG-B fields. Hereinafter, IEEE Std 802.11ax SIG-A and SIG-B fields are respectively referred to as HE-SIG-A and HE-SIG-B fields.

FIG. 6A illustrates an HE PPDU 600 according to an embodiment. A transmitting station generates the HE PPDU frame 600 and transmits it to one or more receiving stations. The receiving stations receive, detect, and process the HE PPDU frame 600.

The HE PPDU frame 600 includes a Legacy Short Training Field (L-STF) 602, a Legacy (i.e., a Non-High Throughput (Non-HT)) Long Training Field (L-LTF) 604, a Legacy Signal (L-SIG) field 606, which together comprise a legacy preamble 601 and a Repeated L-SIG field (RL-SIG) 608. The L-STF 604 of the HE PPDU has a periodicity of 0.8 μs with 10 periods.

The HE PPDU frame 600 also includes an HE Signal A (HE-SIG-A) field 610, an HE Signal B (HE-SIG-B) field 612, an HE-STF 614, an HE-LTF 616, and an HE-Data field 618. In an embodiment, the HE PPDU frame 600 includes a plurality of HE-SIG-B fields 612 corresponding to different channels, and respective pluralities of HE-STFs 614, HE-LTFs 616, and HE-Data fields 618 corresponding to different channels or resource units.

The legacy preamble 601, the RL-SIG field 608, the HE-SIG-A field 610, and the HE-SIG-B field 612 when present, comprise a first part of the HE PPDU frame 600. In an embodiment, the first part of the HE PPDU frame 600 is decoded using a 64-element Discrete Fourier Transform (DFT), having a basic subcarrier spacing of 312.5 KHz.

The HE-SIG-A field 610 is duplicated on each 20 MHz segment after the legacy preamble to indicate common control information. The HE-SIG-A field 610 includes a plurality of OFDM HE-SIG-A symbols 620 each having a duration (including a Guard Interval (GI)) of 4 μs. A number of the HE-SIG-A symbols 620 in the HE-SIG-A field 610 is determined as either 2 or 4 depending on a type of the HE PPDU 600. In an embodiment, an HE-SIG-A field 610 of an HE Extended Range Single User (SU) PPDU include 4 HE-SIG-A symbols 620, and HE-SIG-A fields 610 of other types of HE PPDU include 2 HE-SIG-A symbols 620.

The HE-SIG-B field 612 is included in HE Multi-User (MU) PPDU(s). The HE-SIG-B field 612 includes a plurality of OFDM HE-SIG-B symbols 622 each having a duration including a GI of 4 μs. In embodiments, one or more of HE SU PPDUs, HE Tigger-based PPDUs, and HE Extended Range SU PPDUs do not include the HE-SIG-B field 612. A number of the HE-SIG-B symbols 622 in the HE-SIG-B field 612 is indicated by $N_{HE-SIGB}$ in the HE-SIG-A field 610 and is variable.

When the HE PPDU 600 has a bandwidth of 40 MHz or more, the HE-SIG-B field 612 may be transmitted in first and second HE-SIG-B channels 1 and 2. The HE-SIG-B field in the HE-SIG-B channel 1 is referred to as the HE-SIG-B1 field, and the HE-SIG-B field in the HE-SIG-B channel 2 is referred to as the HE-SIG-B2 field. The HE-SIG-B1 field and the HE-SIG-B2 field are communicated using different 20 MHz bandwidths of the HE PPDU 600, and may contain different information. Within this document, the term "HE-SIG-B field" may refer to an HE-SIG-B field of a 20 MHz PPDU, or to either or both of an HE-SIG-B1 field or HE-SIG-B2 field of a 40 MHz or more PPDU.

An HE-STF 614 of a non-trigger-based PPDU has a periodicity of 0.8 μs with 5 periods. A non-trigger-based PPDU is a PPDU that is not sent in response to a trigger frame. An HE-STF 614 of a trigger-based PPDU has a periodicity of 1.6 μs with 5 periods. Trigger-based PPDUs include UL PPDUs sent in response to respective trigger frames.

The HE-LTF 616 includes one or more OFDM HE-LTF symbols 626 each having a duration of 12.8 μs plus a Guard Interval (GI). The HE PPDU frame 600 may support a 2×LTF mode and a 4×LTF mode. In the 2×LTF mode, an HE-LTF symbol 626 excluding a Guard Interval (GI) is equivalent to modulating every other tone in an OFDM symbol of 12.8 μs excluding the GI, and then removing the second half of the OFDM symbol in a time domain. A number of the HE-LTF symbols 626 in the HE-LTF field 616 is indicated by $N_{HE-LTF}$, and is equal to 1, 2, 4, 6, or 8.

The HE-Data field 618 includes one or more OFDM HE-Data symbols 628 each having a duration of 12.8 μs plus a Guard Interval (GI). A number of the HE-Data symbols 628 in the HE-Data field 618 is indicated by $N_{DATA}$ and is variable.

FIG. 6B shows a Table 1 indicating additional properties of the fields of the HE PPDU frame 600 of FIG. 6A, according to an embodiment.

The descriptions below, for sake of completeness and brevity, refer to OFDMA-based 802.11 technology. Unless otherwise indicated, a station refers to a non-AP HE STA, and an AP refers to an HE AP.

In this disclosure, multi-user (MU) transmission refers to cases that multiple frames are transmitted to or from multiple STAs simultaneously using different resources, wherein examples of different resources are different frequency resources in OFDMA transmission and different spatial streams in MU-MIMO transmission. Therefore, DL-OFDMA, DL-MU-MIMO, UL-OFDMA, and UL-MU-MIMO are examples of MU transmission.

For several reasons, the IEEE Std 802.11ax may require more protection mechanisms for MU transmission than the DL MU-MIMO defined in the IEEE Std 802.11ac. The first reason is that the IEEE Std 802.11ax operation scenario is different, in that it encompasses denser wireless environments and outdoor support. Also, the coverage of an IEEE Std 802.11ax BSS may be physically larger compared to an IEEE Std 802.11ac BSS. Both of these factors create a need for more robust protection mechanisms.

The second reason is that IEEE Std 802.11ax supports not only DL MU transmission but also UL MU transmission. In the case of UL MU transmission, as the number of frames that might be transmitted from each STA are larger, it requires more protection from other nearby transmitting STAs. Another reason is that in an IEEE Std 802.11ax environment, an AP may want to have more control of the medium by use of scheduled access mechanisms, which may involve more frequent use of OFDMA/MU-MIMO transmissions.

UL MU PPDUs (MU-MIMO or OFDMA) are sent as a response to a Trigger frame sent by the AP. The Trigger frame may have enough STA specific information and respective assigned resource units to identify the STAs which are supposed to transmit UL MU PPDUs.

Four HE PPDU formats, illustrated in FIGS. 7A through 7D, are defined by the IEEE Std 802.11ax: HE SU PPDU, HE MU PPDU, HE extended range SU PPDU and HE trigger-based (TB) PPDU. Elements in FIGS. 7A through 7D having reference characters of the form 7xx are substantially similar to elements of FIG. 6A having reference characters of the form 6xx, and descriptions thereof are therefore omitted for brevity. The frames shown in FIGS. 7A through 7D also include a Packet Extension (PE) 730.

Figure 7A:
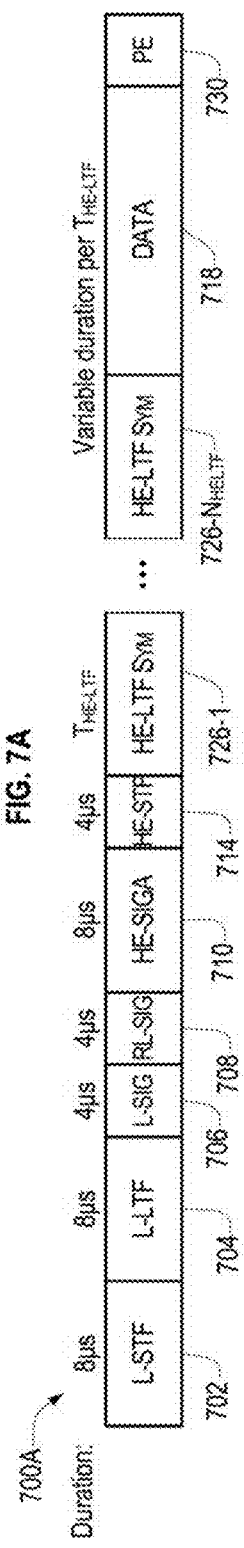
FIG. 7A illustrates a format of a High Efficiency (HE) Single User (SU) PPDU according to an embodiment.

FIG. 7A illustrates a format of a High Efficiency (HE) Single User (SU) PPDU 700A according to an embodiment. The HE SU PPDU 700A is used for SU transmission and in this format the HE-SIG-A field 710 is not repeated. The HE SU PPDU 700A does not have an HE-SIG-B field.

Figure 7B:
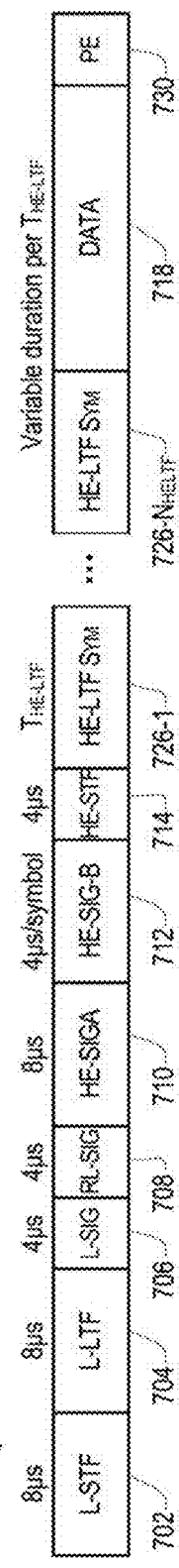
FIG. 7B illustrates a format of an HE Multi-User (MU) PPDU frame according to an embodiment.

FIG. 7B illustrates a format of an HE Multi-User (MU) PPDU frame 700B according to an embodiment. This format is used for MU transmissions that are not a response of a Trigger frame. An HE-SIG-B field 712 is present in this format. A number of symbols in the HE-SIG-B field 712 may be determined according to information in the HE-SIG-A field 710 (for example, an HE-SIG-B compression indication), a bandwidth of the PPDU frame 700B, and a number of User fields indicated in a Common field of the HE-SIG-B field 712 when the Common field is present in the HE-SIG-B field 712.

Figure 7C:
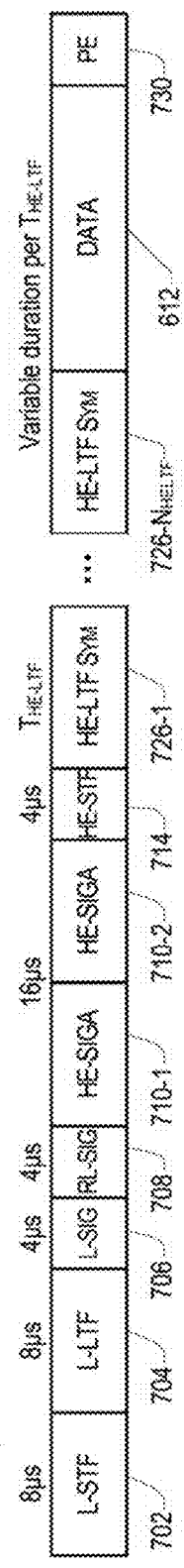
FIG. 7C illustrates a format of an HE Extended Range (ER) SU PPDU according to an embodiment.

FIG. 7C illustrates a format of an HE Extended Range (ER) SU PPDU 700C according to an embodiment. This format is used for SU transmission and in this format the HE-SIG-A field 710 is repeated (as first and second HE-SIG-A field 710-1 and 710-2).

Figure 7D:
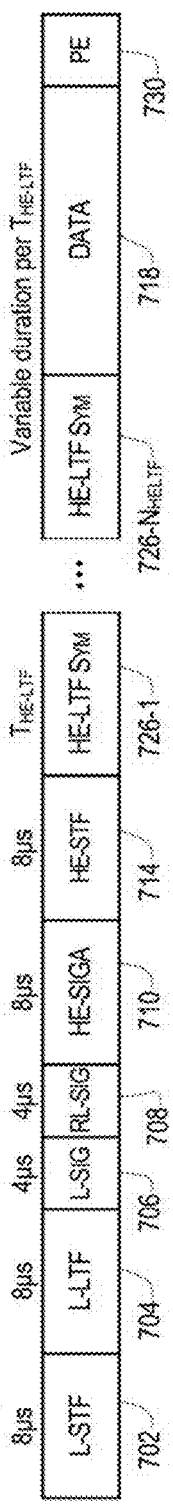
FIG. 7D illustrates a format of an HE Trigger-Based (TB) PPDU 700D according to an embodiment.

FIG. 7D illustrates a format of an HE Trigger-Based (TB) PPDU 700D according to an embodiment.

Figure 8:
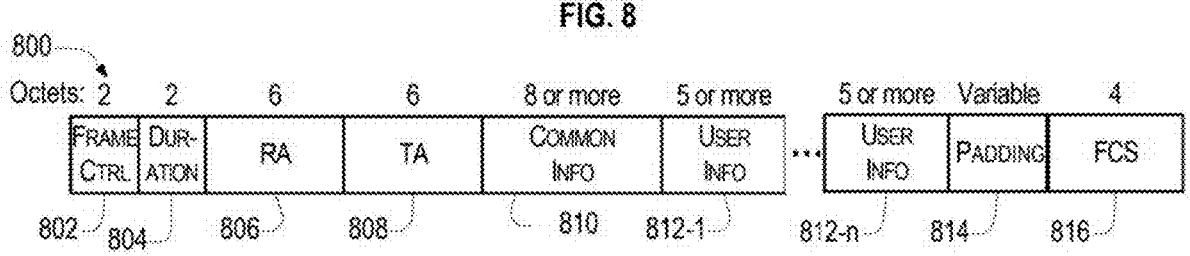
FIG. 8 illustrates a Trigger frame according to an embodiment.

FIG. 8 illustrates a Trigger frame 800 according to an embodiment. The Trigger frame 800 is used to allocate resources for a UL MU transmission and to solicit the UL MU transmission to be performed after (as a response to) the PPDU that carries the Trigger frame. The Trigger frame also carries other information required by the responding STAs to send the UL MU transmission.

The Trigger frame 800 includes a Frame Control field 802, a Duration field 804, a Receiver Address (RA) field 806, a Transmitter Address (TA) field 808, a Common Info field 810, on or more User Info fields 812-x, optional Padding 814, and a Frame Check Sequence (FCS) field 816.

A value of the Frame Control field 802 indicates that the Trigger frame 800 is a trigger frame. A value of the Duration field 804 indicates a length of the Trigger frame 800. A value of the RA field 806 of the Trigger frame is the address of a recipient station or a broadcast address corresponding to one or more recipient stations. A value of a TA field 804 of the Trigger frame is an address of the station transmitting the Trigger frame.

Figure 9:
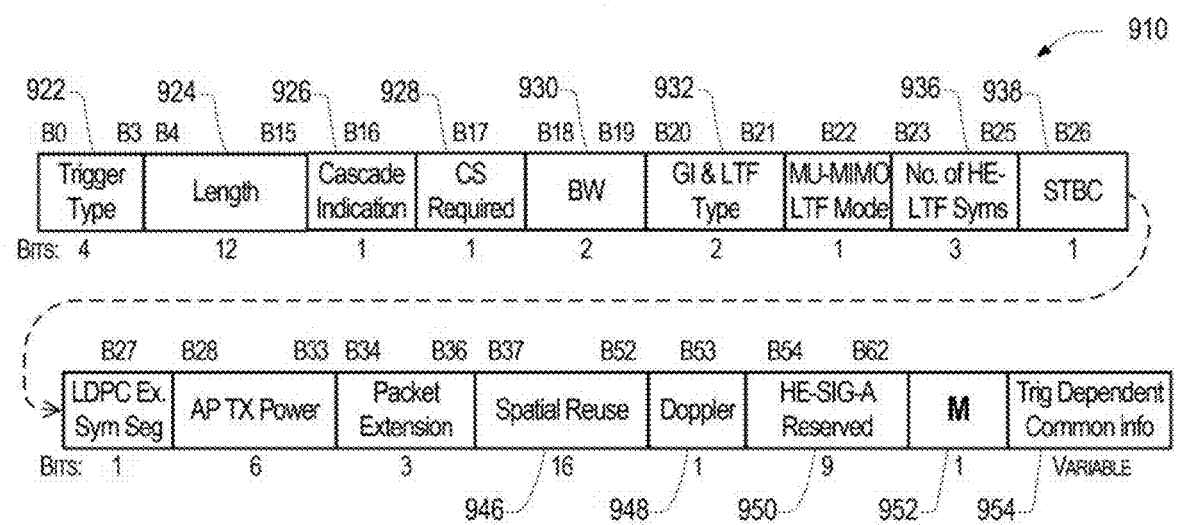
FIG. 9 illustrates a Common Info field according to an embodiment.

FIG. 9 illustrates a Common Info field 910 according to an embodiment. The Common info field 910 is suitable for use as the Common info field 810 of the Trigger frame 800 of FIG. 8. The Common Info field 910 includes a Trigger Type subfield 922, a Length subfield 924, a Cascade Information subfield 926, a Carrier Sense (CS) Required subfield 928, a Bandwidth (BW) subfield 930, a Guard Interval (GI) and Long Training Field (LTF) Type subfield 932, a Number of HE-LTF Symbols subfield 936, a Space-Time Bloc Coding subfield 938, a Spatial Reuse subfield 946, a Doppler subfield 948, and a HE-SIG-A Reserved subfield 950. In some Trigger frames, the Common Info field 910 also includes a Trigger-Dependent Common Info subfield 954.

The Trigger Type subfield 922 that indicates a type of the Trigger frame. Depending on the type of the Trigger frame, the Trigger frame can include the optional type-specific Trigger Dependent Common Info field 954 and (in each of the Per User Info field(s) of the Trigger frame) optional Type-specific Per User Info fields.

The Length subfield 924 that indicates the value of an L-SIG Length field of an HE TB PPDU transmitted in response to the Trigger frame. The Cascade Indication subfield 926 when set to 1 indicates that a subsequent Trigger frame follows the current Trigger frame, and that otherwise has a value of 0.

The CS Required subfield 928 being set to 1 indicates that station(s) identified in the Per User Info field(s) of the Trigger frame are required to use Energy Detect (ED) to sense the medium and to consider the medium state and a NAV in determining whether to respond to the Trigger frame. The CS Required subfield 928 being set to 0 indicates that the station(s) identified in the Per User Info field(s) are not required to consider the medium state or the NAV in determining whether to respond to the Trigger frame.

The BW subfield 930 indicates a bandwidth in an HE-SIG-A field of an HE TB PPDU transmitted in response to the Trigger Frame. The CP and LTF Type subfield 932 indicates a CP and an HE-LTF type of the HE TB PPDU transmitted in response to the Trigger frame.

The HE-SIG-A Reserved subfield 950 indicates contents of an HE-SIG-A field of the HE TB PPDU transmitted in response to the Trigger frame. In an embodiment, all values in the HE-SIG-A Reserved subfield are set to 1.

A Spatial Reuse (SR) subfield 946 provides spatial reuse information. For a communication using a 20 MHz BW the SR subfield 946 provides one SR field corresponding to entire 20 MHz, and the other 3 fields indicate identical values. For a communication using a 40 MHz BW the SR subfield 946 provides two SR field respectively corresponding to each 20 MHz, and the other 2 fields indicate identical values. For a communication using an 80 MHz BW the SR subfield 946 provides four SR field respectively corresponding to each 20 MHz. For a communication using a 160 MHz BW the SR subfield 946 provides four SR field respectively corresponding to each 40 MHz.

The Doppler subfield 948 supports proper performance even in outdoor mobility use cases. When the Doppler subfield 948 indicates a first value (e.g., is set to 1), a PPDU transmitted in response to the Trigger frame including the Common Info field 90 includes Mid-amble fields made up of multiple HE-LTFs that are inserted every mid-amble periodicity (M) data symbols, as described below.

In some embodiments of the present disclosure, the Common Info field 910 may include a Mid-amble Interval (M) field 952, described below, indicating a number of data symbols between mid-ambles when the Doppler subfield 948 has a value of 1.

Figure 10:
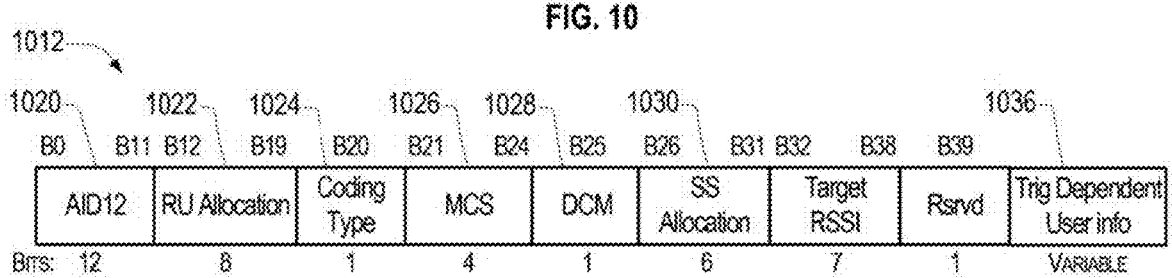
FIG. 10 illustrates a User Info field according to an embodiment.

FIG. 10 illustrates a User Info field 1012 according to an embodiment. The User Info field 1012 is suitable for use as any or all of the User Info fields 812-x of the Trigger frame 800 of FIG. 8. The User Info field 1012 includes an 12-bit User Identifier indicating an Association ID (AID12) subfield 1020, a Resource Unit (RU) Allocation subfield 1022, a Coding Type subfield 1024, an MCS subfield 1026, a Dual Carrier Modulation (DCM) subfield 1028, and a Spatial Stream (SS) Allocation subfield 1030. In some Trigger frames, the User Info field 1012 may include a Trigger-Dependent User Info subfield 1036.

A User Identifier (AID12) subfield 1020 indicates an Association Identifier (AID) of a station allocated a Resource Unit (RU) in which to transmit one or more MPDU(s) in the HE TB PPDU transmitted in response to the Trigger frame. The RU Allocation subfield 1022 indicating the RU to be used to transmit the HE TB PPDU of the station identified by User Identifier subfield. A first bit of the RU Allocation subfield 1022 may indicate whether the allocated RU is located in a primary or a non-primary 80 MHz. The mapping of the subsequent seven bits indices of the RU Allocation subfield 1022 to the RU allocation as one of RU according to the IEEE Std 802.11ax OFDMA numerology.

The Coding Type subfield 1024 indicates a coding type of the HE TB PPDU transmitted in response to the Trigger frame of the station identified by the User Identifier subfield 1020, and set to 0 for BCC and to 1 for LDPC. The MCS subfield 1026 indicates an MCS of the HE TB PPDU transmitted in response to the Trigger frame by the station identified by User Identifier field.

The Dual Carrier Modulation (DCM) subfield 1028 indicates dual carrier modulation of the HE TB PPDU transmitted in response to the Trigger frame by the station identified by User Identifier field 1020. A value of 1 indicates that the HE TB PPDU shall use DCM, and a value of 0 indicates that it shall not.

The Spatial Stream (SS) Allocation subfield 1030 indicates spatial streams of the HE TB PPDU transmitted in response to the Trigger frame by the station identified by User Identifier field 1020.

Figure 11:
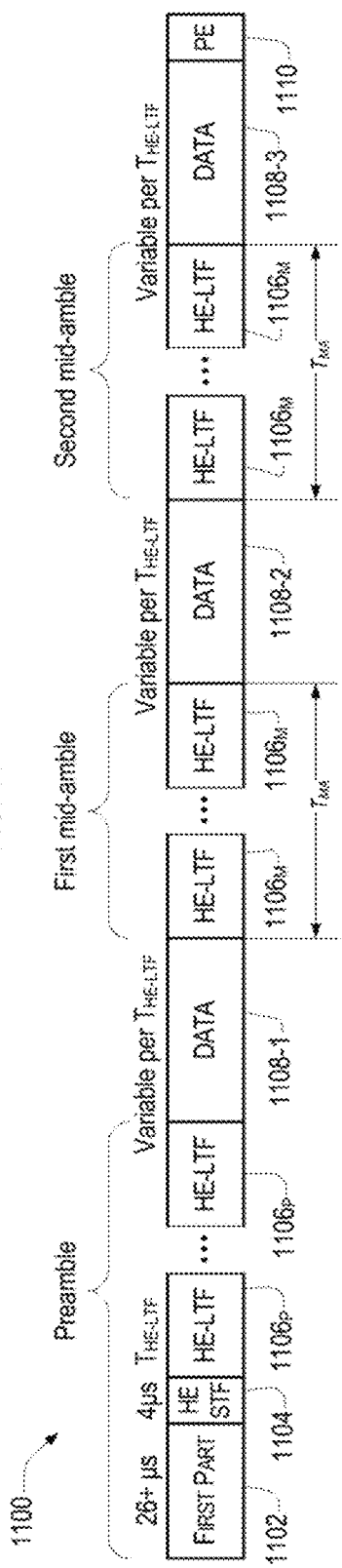
FIG. 11 illustrates a PPDU used when the Doppler subfield is set to 1, according to an embodiment.

FIG. 11 illustrates a PPDU 1100 used when the Doppler subfield 948 is set to 1, according to an embodiment. In the PPDU format 1100, mid-amble fields made up of one or more HE-LTFs $1106_M$ inserted every mid-amble periodicity (M) data symbols of the transmission, as described below. The number of HE-LTFs $1106_M$ in each mid-amble field is equal to the number of HE-LTFs $1106_P$ in the preamble of the PPDU wherein HE-LTFs $1106_M$ and HE-LTFs $1106_P$ are defined as mid-amble HE-LTFs and preamble HE-LTFs, respectively.

The PPDU 1100 includes a first part 1102 corresponding to the first part of the PPDU 600 of FIG. 6. The first part 1102 is followed by an HE-STF 1104 and one or more preamble HE-LTFs $1106_P$. The first part 1102, HE-STF 1104, and one or more preamble HE-LTFs $1106_P$ correspond to a preamble of the PPDU 1100.

After the preamble, the PPDU 1100 includes a first data portion 1108-1 including M data symbols. After the first data portion 1108-1, the PPDU 1100 includes a first mid-amble including one or more mid-amble HE-LTFs $1106_M$. The duration of the first mid-amble is a mid-amble duration $T_{MA}$.

After the first mid-amble, the PPDU 1100 includes a second data portion 1108-2 including M data symbols. After the second data portion 1108-2, the PPDU 1100 includes a second mid-amble including one or more mid-amble HE-LTFs $1106_M$. The duration of the second mid-amble is the mid-amble duration $T_{MA}$.

After the second mid-amble, the PPDU 1100 includes a third data portion 1108-3 including the remaining data symbols of the PPDU 1100. After the third data portion 1108-3, the PPDU 1100 includes a Packet Extension 1110.

In some embodiments of the present disclosure, the value of M is determined using information in a Common Info field of a Trigger frame soliciting the PPDU.

Figure 12:
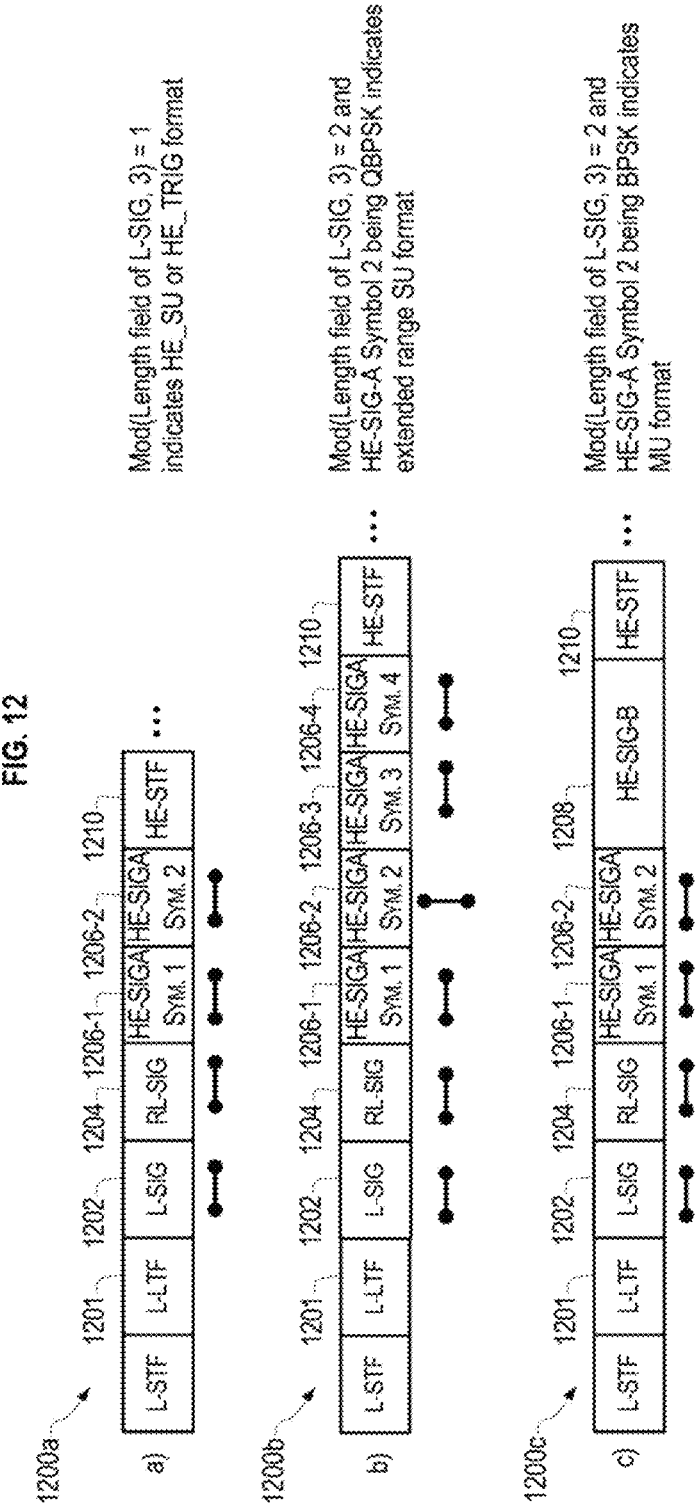
FIG. 12 illustrates signaling of a PPDU format according to an embodiment.

FIG. 12 illustrates signaling of a PPDU format according to an embodiment. FIG. 12 illustrates first, second, and third PPDUs 1200a, 1200b, and 1200c each having a different format. Each PPDU includes at least an L-SIG field 1202, a repeated L-SIG (RL-SIG) field 1204, at least first and second HE-SIG-A symbols 1206-1 and 1206-2, and an HE-STF 1210. In a device operating according to IEEE Std 802.11ax, the device may detect the format of a PPDU based on a value of a Length field included in the L-SIG field 1202 and the rotated constellation of initial symbols of the HE-SIG-A field.

In FIG. 12, symbols having a horizontal bar beneath them are modulated using Binary Phase Shift Keying (BPSK).

Symbols having a vertical bar beneath them are modulated using Quadrature Binary Phase Shift Keying (QBPSK), that is, rotated BPSK.

If a value of the length field in the L-SIG field 1202 modulo 3 is equal to 1, the detected PPDU is either an HE SU PPDU (bit B0 of the HE-SIG-A field=1) or an HE Trigger based PPDU (bit B0 of the HE-SIG-A field=0). Accordingly, in FIG. 12, PPDU 1200a is either an HE SU PPDU or an HE TB PPDU.

If a value of the length field in the L-SIG field 1202 modulo 3 is equal to 2, the PPDU format is either an HE extended range SU PPDU (indicated by second HE-SIG-A symbols 1206-2 being modulated using QBPSK) or an HE MU PPDU (indicated by second HE-SIG-A symbols 1206-2 being modulated using BPSK). Accordingly, in FIG. 12, PPDU 1200b is an HE extended range SU PPDU and includes third and fourth HE-SIG-A symbols 1206-3 and 1206-4 modulated using BPSK, and PPDU 1200a is a HE MU PPDU and includes an HE-SIG-B field 1208, the HE-SIG-B field 1208 including a plurality of symbols.

Embodiments include processes for inserting mid-ambles into a PPDU according to the PPDU format, and processes for determining where the mid-ambles are inserted in a PPDU once the PPDU format is detected. How the mid-ambles are inserted in an HE PPDU could be different depending on the format of the PPDU.

Generally, information transmitted using higher data rates (e.g. higher MCS) is more vulnerable to detrimental effect associated with mobility environments. Therefore, introducing mid-amble field according to a small mid-amble periodicity M when higher MCS rates are used can enable compensation for phase drift and thereby improving performance.

FIG. 13 illustrates a process 1300, according to an embodiment, for determining a mid-amble periodicity M according to format of a PPDU. The process 1300 may be used, for example, when Doppler subfield of a Common info field of a Trigger frame is set to 1. In such a case, the process 1300 may be used to determine the mid-amble periodicity M of a PPDU transmitted in response to the Trigger frame.

At S1302, the process 1300 determines whether the PPDU format is any one of an HE SU, HE SU ER, or HE UL MU format. For a received PPDU, the PPDU format may be determined according to one or more of a length in an L-SIG field, a modulation of a second symbol of an HE-SIG-A field, and a B0 bit of the HE-SIG-A field. In response to the PPDU format being an HE SU, HE SU ER, or HE UL MU format, at S1302 the process 1300 proceeds to S1312; otherwise, at S1302 the process 1300 proceeds to S1304.

At S1304, the process 1300 determines whether the PPDU format is a multi-user HE DL MU format. For a received PPDU, the PPDU format may be determined according to a length in an L-SIG field and a modulation of a second symbol of an HE-SIG-A field. In response to the PPDU format being a multi-user HE DL MU format, at S1304 the process 1300 proceeds to S1314; otherwise, at S1304 the process 1300 proceeds to S1306.

At S1306, the process 1300 determines whether the PPDU format is an HE Trigger-Based (TB) format for a PPDU. In response to the PPDU format being an HE TB format, at S1306 the process 1300 proceeds to S1316; otherwise, at S1306 the process 1300 exits.

At S1312, the process 1300 determines the mid-amble periodicity M according to an MCS of the PPDU, and then exits.

At S1314, the process 1300 determines the mid-amble periodicity M according to a highest MCS of the respective MCS values of the STA assigned to participate in the MU PPDU, and then exits.

At S1316, the process 1300 determines the mid-amble periodicity M according to an a predetermined value, without regard to the values of assigned MCS in the Trigger frame that solicits the STAs to perform an UL MU transmission, and then exits.

In an embodiment, the mid-amble periodicity M for Trigger-Based PPDUs could be signaled for all STAs participating in the TB PPDU in a field of the Trigger frame soliciting the TB PPDU, as previously described with respect to FIG. 9.

Referring to FIG. 9, when the Doppler subfield 948 is set to a first state (e.g., 1), the mid-amble periodicity (M) subfield 952 has a value corresponding to a number of data symbols between mid-ambles. When the Doppler subfield 948 is set to a second state (e.g., 0), the mid-amble periodicity (M) subfield 952 is reserved.

FIG. 14 illustrates a process 1400, according to another embodiment, for determining a mid-amble periodicity M according to format of a PPDU. The process 1400 may be used, for example, when Doppler subfield of a Common info field of a Trigger frame is set to 1. In such a case, the process 1500 may be used to determine the mid-amble periodicity M of a PPDU transmitted in response to the Trigger frame.

At S1402, the process 1400 determines whether the PPDU format is either the HE SU or HE SU ER format. In response to the PPDU format being either the HE SU or HE SU ER format, at S1402 the process 1400 proceeds to S1412; otherwise, at S1402 the process 1400 proceeds to S1404.

At S1404, the process 1400 determines whether the PPDU format is a multi-user HE MU format (either UL or DL). In response to the PPDU format being a multi-user HE MU format, at S1404 the process 1400 proceeds to S1414; otherwise, at S1404 the process 1400 proceeds to S1406.

At S1406, the process 1400 determines whether the PPDU format is an HE TB format for a PPDU. In response to the PPDU format being an HE TB format, at S1406 the process 1400 proceeds to S1416; otherwise, at S1406 the process 1400 exits.

At S1412, the process 1400 determines the mid-amble periodicity M according to an MCS of the PPDU, and then exits.

At S1414, the process 1400 determines the mid-amble periodicity M according to a highest MCS of the respective MCS values of the STA assigned to participate in the MU PPDU, and then exits. At S1414, when only one STA is assigned to participate in an MU PPDU (for example, an UL MU PPDU), the process 1400 determines the mid-amble periodicity M according to an MCS of the only one STA, and then exits.

At S1416, the process 1400 determines the mid-amble periodicity M according to a predetermined value, without regard to the values of assigned MCS in the Trigger frame that solicits the STAs to perform an UL MU transmission, and then exits.

Figure 15:
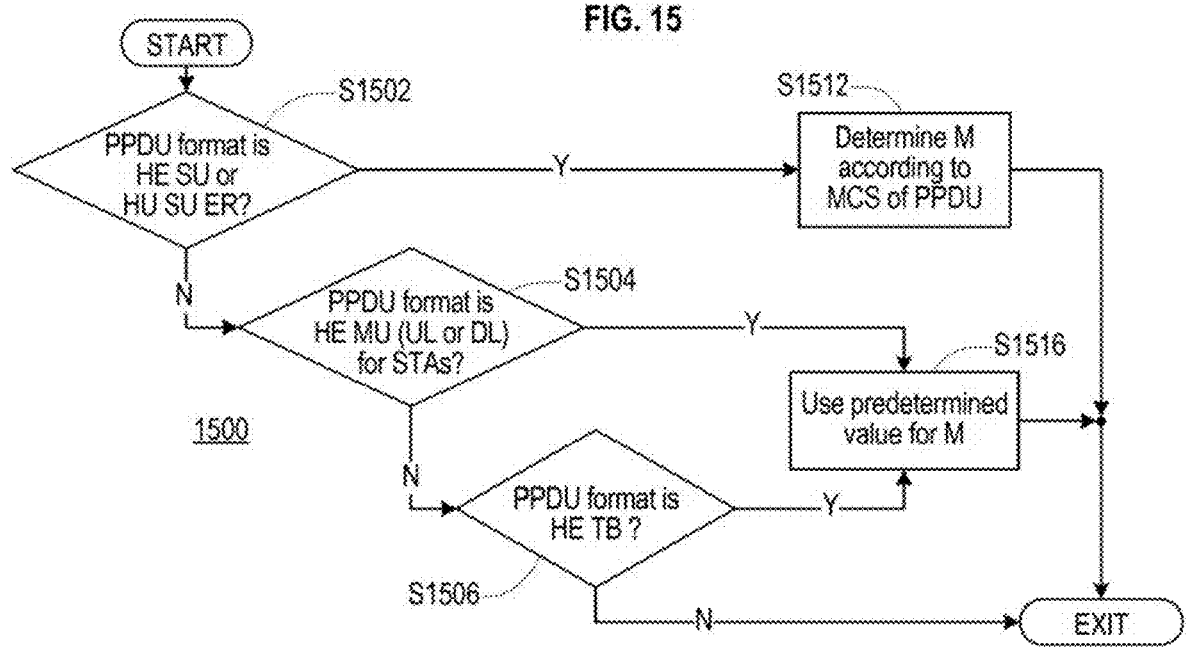
FIG. 15 illustrates a process, according to another embodiment, for determining a mid-amble periodicity M according to format of a PPDU.

FIG. 15 illustrates a process 1500, according to another embodiment, for determining a mid-amble periodicity M according to format of a PPDU.

At S1502, the process 1500 determines whether the PPDU format is either the HE SU or HE SU ER format. In response to the PPDU format being either the HE SU or HE SU ER format, at S1502 the process 1500 proceeds to S1512; otherwise, at S1502 the process 1500 proceeds to S1504.

At S1504, the process 1500 determines whether the PPDU format is a multi-user HE MU format (either UL or DL). In response to the PPDU format being a multi-user HE MU format, at S1504 the process 1500 proceeds to S1516; otherwise, at S1504 the process 1500 proceeds to S1506.

At S1506, the process 1500 determines whether the PPDU format is an HE Trigger-Based (TB) format for a PPDU. In response to the PPDU format being an HE TB format, at S1506 the process 1500 proceeds to S1516; otherwise, at S1506 the process 1500 exits.

At S1512, the process 1500 determines the mid-amble periodicity M according to an MCS of the PPDU, and then exits.

At S1516, the process 1500 determines the mid-amble periodicity M according to a predetermined value, regardless of any MCS values, and then exits.

Figure 16:
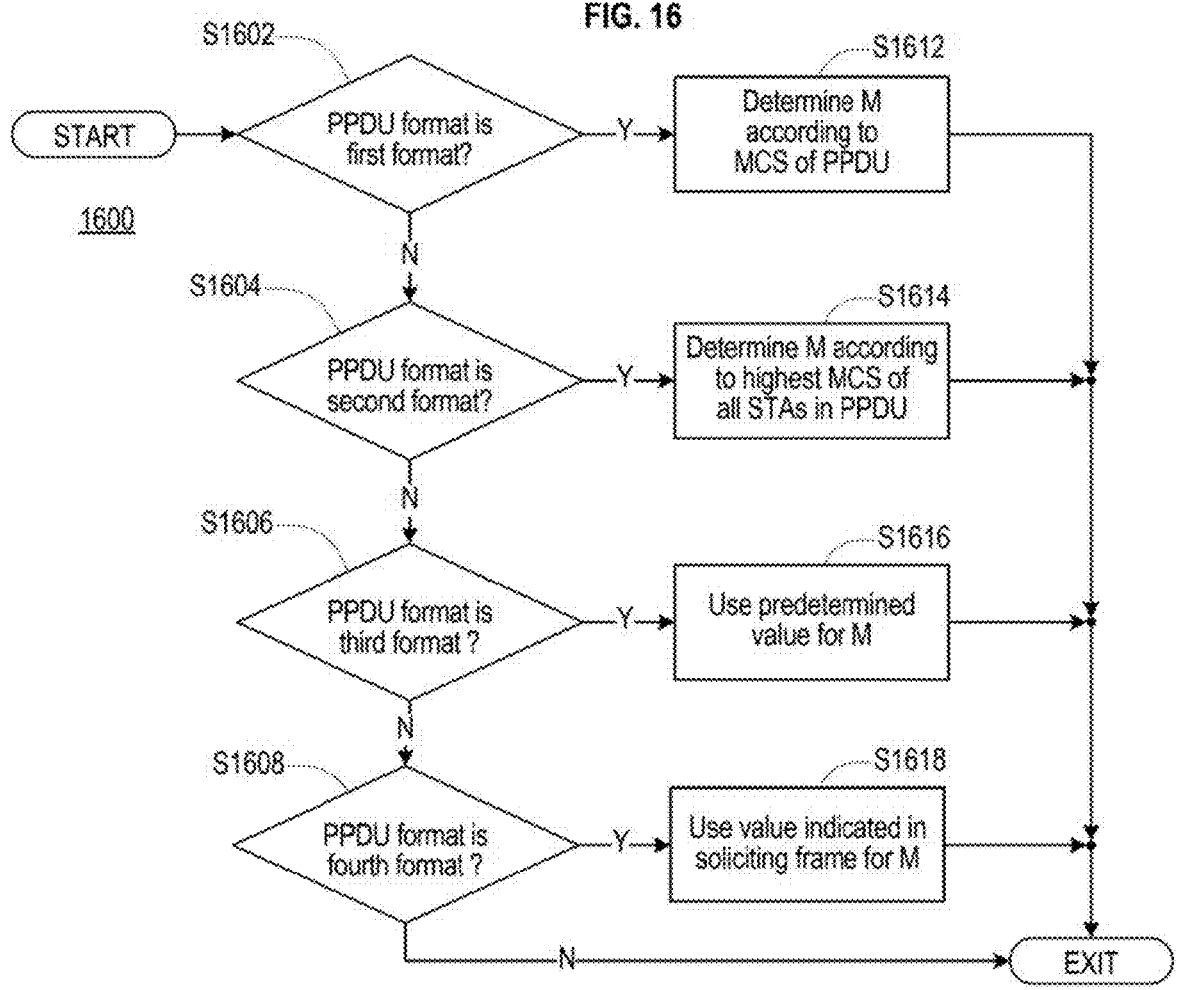
FIG. 16 illustrates a process, according to another embodiment, for determining a mid-amble periodicity M according to format of a PPDU.

FIG. 16 illustrates a process 1600, according to another embodiment, for determining a mid-amble periodicity M according to a format of a PPDU. The process 1600 may be used when a Doppler subfield indicates the presence of mid-ambles in the PPDU.

At S1602, the process 1600 determines whether the PPDU format is a first format. In an embodiment, the first format includes the HE SU format. In an embodiment, the first format includes the HE ER SU format. In an embodiment, the first format includes the single-user HE UL MU format. In response to the PPDU format being the first format, at S1602 the process 1600 proceeds to S1612; otherwise, at S1602 the process 1600 proceeds to S1604.

At S1604, the process 1600 determines whether the PPDU format is a second format. In an embodiment, the second format includes the HE MU format. In an embodiment, the second format includes the HE DL MU format for more than one user. In response to the PPDU format being the second format, at S1604 the process 1600 proceeds to S1614; otherwise, at S1604 the process 1600 proceeds to S1606.

At S1606, the process 1600 determines whether the PPDU format is a third format. In an embodiment, the third format includes the HE TB format. In an embodiment, the third format includes the HE MU format. In response to the PPDU format being the third format, at S1606 the process 1600 proceeds to S1616; otherwise, at S1606 the process 1600 proceeds to S1608.

At S1608, the process 1600 determines whether the PPDU format is a fourth format. In an embodiment, the fourth format includes the HE TB format. In response to the PPDU format being the fourth format, at S1608 the process 1600 proceeds to S1618; otherwise, at S1608 the process 1600 exits.

At S1612, the process 1600 determines the mid-amble periodicity M according to an MCS of the PPDU, and then exits.

At S1614, the process 1600 determines the mid-amble periodicity M according to a highest values of MCS values of all assigned STAs in the PPDU. In an embodiment, only one STA could be assigned. The process 1600 then exits.

At S1616, the process 1600 determines the mid-amble periodicity M according to a predetermined value, regardless of any MCS values, and then exits.

At S1618, the process 1600 determines the mid-amble periodicity M according to a value indicated in a frame that solicits the STAs to send the PPDU in response to the frame, and then exits. In an embodiment, the soliciting frame could be a Trigger frame.

In a first embodiment, for any of an HE SU PPDU, HE SU extended range PPDU, and UL HE PPDU for one user transmission, when a Doppler subfield is set to a first state that indicates that the PPDU is transmitted with mid-ambles, the HE PPDU format is considered in determining the mid-amble periodicity M. A transmitter inserts a Mid-amble field after every mid-amble periodicity M OFDM data symbols encoded according to an MCS value of the PPDU. Each mid-amble fields may be used to perform channel estimation for data symbols that follow the mid-amble field. When receiving the PPDU, once a receiver decodes an MCS value in a PHY preamble of the PPDU correctly, the location and length of Mid-amble field(s) can be determined.

In a DL MU transmission with STAs assigned with different MCS values, the mid-amble fields might not be lined up for the resource block allocated to the respective STAs, and as a result an FFT window may not line up across resource blocks, which may increase implementation complexity. The MCS values for each assigned STA may be determined by all of the all STAs because the HE-SIG-B field that communicates the MCS values to the STAs is not beamformed.

In an embodiment, for DL HE MU PPDUs targeted for more than one user, when the Doppler subfield is set to a first state that indicates that the PPDU is transmitted with mid-ambles, the HE PPDU format is considered in determining the mid-amble periodicity M. A transmitter inserts a Mid-amble field after every mid-amble periodicity M OFDM data symbol according to a maximum MCS value among the STAs participating in the DL HE MU PPDU. Each mid-amble fields may be used to perform channel estimation for data symbols that follow the mid-amble field. When receiving the PPDU, once a receiver decodes all the MCS values for each STA correctly, the location and length of Mid-amble field(s) can be determined based on maximum MCS value among the STAs.

In an UL MU transmission with STAs assigned with different MCS values, the mid-amble fields might not be lined up for the resource block allocated to the respective STAs, and as a result an FFT window may not line up across resource blocks, which may increase implementation complexity. Implementation of an AP may be made easier if all mid-amble feeds from all users in an UL MU transmission end at a same point.

In an embodiment, for UL HE MU PPDUs, when the Doppler subfield is set to a first state that indicates that the PPDU is transmitted with mid-ambles, the HE PPDU format is considered in determining the mid-amble periodicity M for HE trigger-based (TB) PPDUs of the UL HE MU transmission. Each STA determines all MCS values in each user info field of the Trigger frame. A responding STA inserts a Mid-amble field on every mid-amble periodicity M data symbols based on the maximum MCS value among assigned STAs. When the AP receives the HE TB PPDUs from the assigned STAs, the location and length of Mid-amble field can be determined according to the maximum MCS value among assigned STAs.

In an embodiment, for UL HE MU PPDUs, when the Doppler subfield of a received Trigger frame is set to a first state that indicates that the PPDU is transmitted with mid-ambles, the HE PPDU format is considered in determining the mid-amble periodicity M for HE TB PPDUs transmitted in response to the Trigger frame. The mid-amble periodicity M has a predetermined value, and therefore each STA does not need to see all MCS values in each user info field of the Trigger frame. A responding STA inserts Mid-amble field after the pre-determined mid-amble periodicity M data symbols regardless of MCS values assigned for STAs in UL transmission. When AP receives the HE TB PPDUs from assigned STAs, the location and length of Mid-amble field can be expected based on the pre-determined mid-amble periodicity M value.

Figure 17:
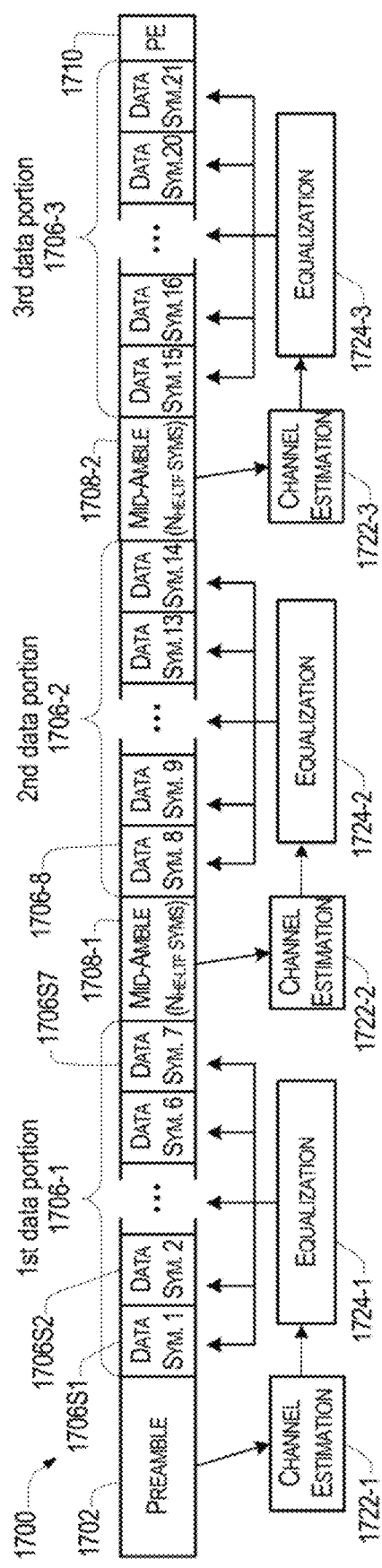
FIG. 17 illustrates a PPDU including mid-ambles according to an embodiment.

FIG. 17 illustrates a PPDU 1700 including mid-ambles according to an embodiment. The PPDU 100 includes a preamble 1702, first, second, and third data portions 1706-1, 1706-2, and 1706-3, first and second mid-ambles 1708-1 and 1708-2, and a Packet Extension (PE) 1710. The first data portion 1706-1 starts with a first data symbol 1706S1 followed by a second data symbol 1706S2, and ends with a seventh data symbol 1706S7. The second data portion 1706-2 starts with an eighth data symbol 1706S8. In the illustrative example shown, the mid-amble periodicity M is equal to 7.

A first channel estimation 1722-1 is performed using the preamble 1702 to produce parameters for a first equalization 1724-1 to be performed on the symbols of the first data portion 1706-1. A second channel estimation 1722-2 is performed using the first mid-amble 1708-1 to produce parameters for a second equalization 1724-2 to be performed on the symbols of the second data portion 1706-2. A third channel estimation 1722-3 is performed using the second mid-amble 1708-2 to produce parameters for a third equalization 1724-3 to be performed on the symbols of the third data portion 1706-3.

For IEEE Std 802.11 devices, a Space-Time Block Coding STBC process has been implemented to provide stable performance in edge areas of an AP's coverage. STBC operation pairs two OFDM symbols and transmits the paired symbols in consecutive time slots, and a receiver decodes the paired symbols together. For example, when the PPDU 1700 is transmitted using STBC, the first data symbol 1706S1 is paired with the second data symbol 1706S2, the third, with the fourth, and so on.

But the paired seventh data symbol 1706S8 and eighth data symbol 1706S8 are separated by the first mid-amble 1708-1. As a result, the system needs to wait to get the new channel information from the second channel estimation 1722-2 in order to decode the two OFDM symbol together, and needs to have a two times bigger buffer size in order to store the two different channel information together (here, the results of the first channel estimation 1722-1 using the preamble 1702 and the results of the second channel estimation 1722-2 using the first mid-amble 1708-1).

In an embodiment, when STBC is enabled and a Doppler subfield is set to a first state to indicate the transmitted PPDU includes one or more mid-amble fields, a transmitter inserts Mid-amble fields after every mid-amble periodicity M OFDM data symbols of a PPDU. If a mid-amble field is located between two OFDM symbols paired for STBC operation, the mid-amble field is shifted to the location after the two paired OFDM symbols.

In another embodiment, when STBC is enabled and a Doppler subfield is set to a first state to indicate the transmitted PPDU includes one or more mid-amble fields, a transmitter inserts Mid-amble fields after every mid-amble periodicity M OFDM data symbols of a PPDU. If a Midamble field is located between two OFDM symbols to be paired for STBC operation the Mid-amble field is shifted to the location before the two paired OFDM symbols.

In either embodiment, when receiving the PPDU, once a receiver decodes a STBC value in the PHY preamble of the PPDU correctly, the location and length of Mid-amble field can be determined.

In another embodiment, the value of the mid-amble periodicity M is always an even number, and as a result the Mid-amble field always occurs before or after two OFDM data symbols paired for STBC operation, and never occurs between the paired symbols.

When a transmitter sends data of APEP_LENGTH bytes in an HE PPDU wherein the Doppler subfield is set to the first state (e.g. 1) indicating the presence of one or more mid-ambles, the data in transmitted in a number of OFDM data symbols $N_{SYM}$. Depending on the coding scheme, the number of data symbols $N_{SYM}$, can be determined by:

$$\text{for } BCC: N_{SYM} = m_{STBC} \cdot \left\lceil \frac{8 \cdot APEP\_LENGTH + N_{Tail} + N_{Service}}{m_{STBC} N_{DBPS}} \right\rceil \quad \text{Eq. 1}$$

$$\text{for } LDPC: N_{SYM} = m_{STBC} \cdot \left\lceil \frac{8 \cdot APEP\_LENGTH + N_{Service}}{m_{STBC} N_{DBPS}} \right\rceil \quad \text{Eq. 2}$$

wherein $m_{STBC}$ is 2 when STBC is used and 1 otherwise, $N_{DBPS}$ is a number of data bits per OFDM symbol, $N_{Tail}$ is a number of tail bits (6), and $N_{Service}$ is a number of service bits (16).

Given $N_{SYM}$, the transmitter sets a value of Length field in L-SIG to:

$$\text{Length} = \left\lceil \frac{TXTIME - SE - 20}{4} \right\rceil \times 3 - 3 - m \quad \text{Eq. 3}$$

wherein:

$TXTIME = 20 + T_{PA} + N_{SYM} T_{SYM} + N_{MA} T_{MA} + T_{PE} + SE,$ $T_{MA} = N_{HE-LTF} T_{HE-LTF} (+T_{HE-STF}),$ and $$N_{MA} = \begin{cases} \lfloor N_{SYM}/M \rfloor & \text{when the Doppler subfield indicates the first state (1),} \\ 0 & \text{when the Doppler subfield indicates the second state (0).} \end{cases}$$

when the Doppler subfield indicates the first state (1), when the Doppler subfield indicates the second state (0). and wherein $N_{MA}$ is the number of mid-ambles, M is the mid-amble periodicity, SE is 0 us when the transmission is in a 5 GHz band and is 6 us when the transmission is in a 2.4 GHz band, $T_{PA}$ is duration of HE preamble as described with respect to FIGS. 7A through 7D, $T_{SYM}$ is duration of a OFDM data symbol, $T_{PE}$ is duration of Packet Extension (which Packet Extensions consists of random values whose average power is that same as the average power of the OFDM data symbols and secures additional receive processing time), and m is 1 for an HE MU PPDU or HE ER SU PPDU, and 2 otherwise. $T_{MA}$ is duration of Mid-amble field, which in an embodiment may include a duration of a HE-STF $T_{HE-STF}$, and in another embodiment may not include the duration of a HE-STF $T_{HE-STF}$.

When a receiver receives an HE PPDU, it needs to determine how many OFDM data symbols, $N_{SYM}$, are transmitted and what amount of time, $T_{PE}$, can be secured for RX processing.

In an embodiment, a device receiving an HE PPDU determines a number of OFDM symbols used for decoding data symbols of the HE PPDU by finding a number of OFDM data symbols ($N_{SYM}$) that satisfies the following equations:

$$N_{MA} = \begin{cases} \lfloor N_{SYM}/M \rfloor & \text{when a Doppler subfield indicates a mid-amble exists,} \\ 0 & \text{otherwise.} \end{cases} \quad \text{Eq. 4}$$

$$N_{SYM} = \left\lfloor \left(\frac{L\_LENGTH + m + 3}{3} \times 4 - T_{PA} - N_{MA}T_{MA}\right) \middle/ T_{SYM} \right\rfloor - b_{PE\text{-}Disambiguity} \quad \text{Eq. 5}$$

wherein $b_{PE\text{-}Disambiguity}$ is the value of a PE Disambiguity bit in the HE-SIG-A field of the PPDU. Once $N_{SYM}$ is obtained, $T_{PE}$ is calculated by:

$$T_{PE} = \left\lfloor \frac{\left(\frac{L\_LENGTH + m + 3}{3} \times 4 - T_{PA} - N_{MA}T_{MA}\right) - N_{SYM}T_{SYM}}{4} \right\rfloor \times 4 \quad \text{Eq. 6}$$

Accordingly, in PPDUs wherein one or more mid-amble fields exist, the receiver may determine the number of OFDM data symbols $N_{SYM}$ using Equation 5, but the number of mid-ambles $N_{MA}$ in Equation 5 is a function of $N_{SYM}$. As a result the number of OFDM symbols $N_{SYM}$ cannot be directly calculated by the receiver, and implementation of the determination of the number of OFDM data symbols $N_{SYM}$ in received PPDUs including one or more mid-ambles can increase the system complexity compared to the case where a mid-amble field is not included in the PPDU. Eliminating the circular dependency of Equations 4 and 5 is difficult because of, for example, the non-linear elements of the equations, such as the floor operations (i.e., $\lfloor x \rfloor$) is each equation.

Embodiments reduce the complexity of a device configured to receive HE PPDUs including mid-ambles by using novel processes for determining the number of OFDM symbols $N_{SYM}$ used for data symbols and the Packet Extension duration $T_{PE}$ of the received HE PPDU.

In order to determine the number of OFDM data symbols $N_{SYM}$ at a receiving device, the use of Equation 5 might be considered. But Equation 5 requires that the value of the number of mid-ambles $N_{MA}$ be known, and Equation 4 establishes that the number of mid-ambles NA is a function of the number of OFDM data symbols $N_{SYM}$. Therefore the number of OFDM data symbols $N_{SYM}$ cannot be directly calculated using Equation 5 when a Doppler subfield of an HE-SIG-A field of the PPDU being received is set to the first state (e.g. 1), indicating that one or more mid-ambles are present. Accordingly a new equation and new assumptions are needed to determine $N_{SYM}$. The new equations may be derived as follows:

Step A1) the floor function can be eliminated from Equation 4 by restating Equation 4 as shown below, using an additional unknown variable $n_0$:

for some $n_0$, $0 \leq n_0 \leq M-1$, $$N_{MA} = \frac{N_{SYM} - n_0}{M} \Rightarrow N_{SYM} = M \cdot N_{MA} + n_0. \quad \text{Eq. 7}$$

Step A2) the floor function can be eliminated from Equation 5 by restating Equation 5 as shown below using an additional unknown variable $\alpha$:

for some $$\alpha, 0 \leq \alpha < 1,$$

$$\left(\frac{L\_LENGTH + m + 3}{3} \times 4 - T_{PA} - N_{MA}T_{MA}\right) \middle/ T_{SYM} = \quad \text{Eq. 8}$$
$$N_{SYM} + b_{PE\text{-}Disambiguity} + \alpha.$$

Step A3) from Step A1 and Step A2, the following equations can be derived:

$$\left(\frac{L\_LENGTH + m + 3}{3} \times 4 - T_{PA} - N_{MA}T_{MA}\right) = \quad \text{Eq. 9}$$
$$T_{SYM}(M \cdot N_{MA} + n_0 + b_{PE\text{-}Disambiguity} + \alpha).$$

$$N_{MA} = \frac{\left(\frac{L\_LENGTH + m + 3}{3} \times 4 - T_{PA}\right) - T_{SYM}(n_0 + b_{PE\text{-}Disambiguity} + \alpha)}{T_{MA} + M \cdot T_{SYM}} \quad \text{Eq. 10}$$

Step A4) from the above, minimum and maximum possible values of $n_0$ and $\alpha$ may be used to determine minimum ($N_{MA\_MIN}$) and maximum ($N_{MA\_MAX}$) possible values for the number of mid-ambles $N_{MA}$:

assume $\alpha = 0$, \quad Eq. 11

$$n_0 = 0: N_{MA\_MAX} = \frac{\frac{L\_LENGTH + m + 3}{3} \times 4 - T_{PA} - T_{SYM} b_{PE\text{-}Disambiguity}}{T_{MA} + M \cdot T_{SYM}}$$

assume $\alpha = 1$, \quad Eq. 12

$$n_0 = M - 1: N_{MA\_MIN} = \frac{\frac{L\_LENGTH + m + 3}{3} \times 4 - T_{PA} - T_{SYM}(b_{PE\text{-}Disambiguity} + M)}{T_{MA} + M \cdot T_{SYM}}$$

and note that:

$$N_{MA\_MIN} < N_{MA} < N_{MA\_MAX} \quad \text{Eq. 13}$$

Step A5) from the above, determine an equation for $(N_{MA\_MAX} - N_{MA\_MIN})$ to determine the scope of the range of possible values for the number of mid-ambles $N_{MA}$:

$$(N_{MA\_MAX} - N_{MA\_MIN}) = \frac{M \cdot T_{SYM}}{T_{MA} + M \cdot T_{SYM}}, \text{ which is } < 1 \quad \text{Eq. 14}$$

Because the difference between $N_{MA\_MAX}$ and $N_{MA\_MIN}$ is less than one and $N_{MA\_MAX}$ is greater than $N_{MA\_MIN}$, floor $(N_{MA\_MAX})$=ceiling$(N_{MA\_MIN})$. Relying on this and on the number of mid-ambles $N_{MA}$ being a positive integer between $N_{MA\_MAX}$ and $N_{MA\_MIN}$, $$N_{MA} = \text{floor}(N_{MA\_MAX}) = \text{ceiling}(N_{MA\_MIN}) \qquad \text{Eq. 15}$$

$$N_{MA} = \left\lfloor \frac{\frac{L\_LENGTH + m + 3}{3} \times 4 - T_{PA} - T_{SYM} b_{PE\text{-}Disambiguity}}{T_{MA} + M \cdot T_{SYM}} \right\rfloor \qquad \text{Eq. 16}$$

$$= \left\lceil \frac{\frac{L\_LENGTH + m + 3}{3} \times 4 - T_{PA} - T_{SYM}(b_{PE\text{-}Disambiguity} + M)}{T_{MA} + M \cdot T_{SYM}} \right\rceil$$

Accordingly, using either of the middle or right portions of Equation 16, the number of mid-ambles $N_{MA}$ may be determined without first determining the number of OFDM symbols $N_{SYM}$ used for decoding data symbols (i.e., the number of OFDM data symbols $N_{SYM}$).

In an embodiment in accordance with Equation 16, a process of identifying a number of OFDM data symbols $N_{SYM}$ and a Packet Extension duration $T_{PE}$ from a received HE PPDU first determines a number of mid-ambles $N_{MA}$ when the Doppler subfield indicates that mid-ambles are present in the received HE PPDU according to:

$$N_{MA} = \left\lfloor \frac{\frac{L\_LENGTH + m + 3}{3} \times 4 - T_{PA} - T_{SYM} \cdot b_{PE\text{-}Disambiguity}}{T_{MA} + M \cdot T_{SYM}} \right\rfloor \qquad \text{Eq. 17}$$

When the Doppler subfield indicates that mid-ambles are not present in the HE PPDU, the number of mid-ambles $N_{MA}$ is 0. Unlike a process relying on Equation 4, the process using Equation 17 to determine the number of mid-ambles $N_{MA}$ does not need to first determine the value $N_{SYM}$ in order to do so.

Once the number of mid-ambles $N_{MA}$ is determined, the process may determine the number of OFDM data symbols $N_{SYM}$ according to Equation 5 and the Packet Extension duration $T_{PE}$ may be determined according to Equation 6.

In another embodiment in accordance with Equation 16, a process of identifying a number of OFDM data symbols $N_{SYM}$ and a Packet Extension duration $T_{PE}$ from a received HE PPDU determines a number of mid-ambles $N_{MA}$ when the Doppler subfield indicates that mid-ambles are present in an HE PPDU according to:

$$N_{MA} = \left\lceil \frac{\frac{L\_LENGTH + m + 3}{3} \times 4 - T_{PA} - T_{SYM}(b_{PE\text{-}Disambiguity} + M)}{T_{MA} + M \cdot T_{SYM}} \right\rceil \qquad \text{Eq. 18}$$

When the Doppler subfield indicates that mid-ambles are not present in the HE PPDU, the number of mid-ambles $N_{MA}$ is 0. The process using Equation 18 to determine the number of mid-ambles $N_{MA}$ does not need to first determine the value of $N_{SYM}$ in order to do so.

Once the number of mid-ambles $N_{MA}$ is determined, the process may determine the number of OFDM data symbols $N_{SYM}$ according to Equation 5 and the Packet Extension duration $T_{PE}$ may be determined according to Equation 6.

The analysis that led to Equations 17 and 18 can be generalized to cover other similar relationships between the number of mid-ambles $N_{MA}$ and the number of OFDM data symbols $N_{SYM}$.

For example, the relationship of Equation 4 would indicate two 2 mid-ambles when the number of OFDM data symbols $N_{SYM}$ is equal to twice the mid-amble periodicity M. This would produce a PPDU as shown in FIG. 18.

Figure 18:
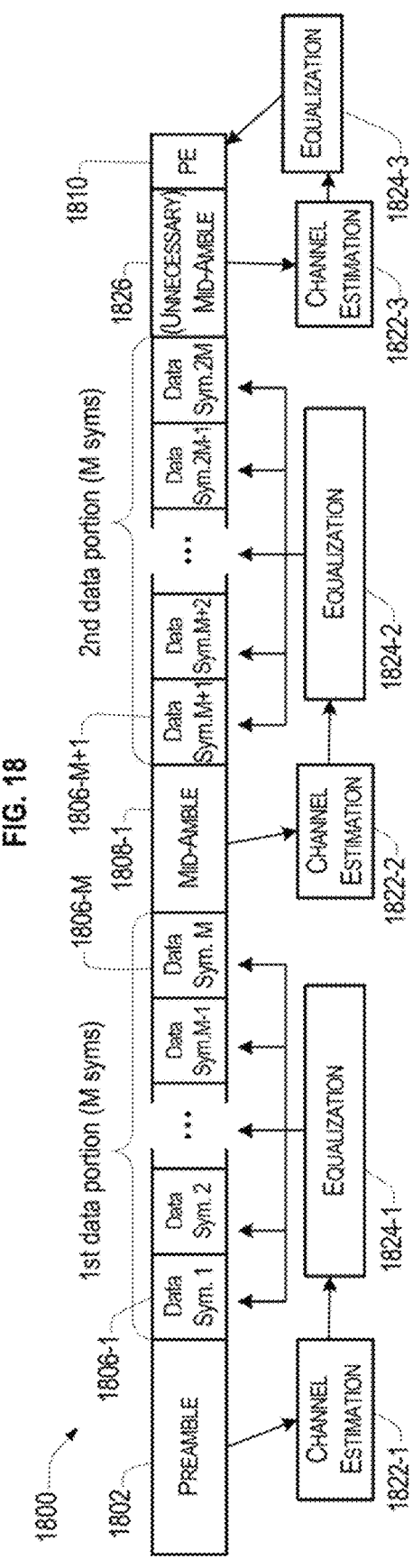
FIG. 18 illustrates a PPDU including mid-ambles according to an embodiment.

FIG. 18 illustrates a PPDU 1800 according to an embodiment. Elements of FIG. 18 having reference characters of the form 18XX or 18XX-X are similar to elements of FIG. 17 having respective reference characters of the form 17XX or 17XX-X, and descriptions thereof are omitted for brevity.

The PPDU 1800 includes 2·M OFDM data symbols, where M is the mid-amble periodicity. As a result, a mid-amble 1808-1 is inserted after the first M OFDM data symbols, and because the embodiment was according to Equation 4, another (unnecessary) mid-amble 1826 was inserted after the last OFDM data symbol. The mid-amble 1826 is unnecessary because the Packet Extension (PE) 1810 is not an OFDM symbols to be decoded, and therefore the third channel estimation 1822-3 and third equalization 1824-3 are not needed.

In an embodiment, to prevent the insertion of this unnecessary mid-amble, a transmitter determines the number of OFDM data symbols $N_{SYM}$ used in a HE PPDU according to Equation 1 or Equation 2, as appropriate, and the Length field of the L-SIG of the HE PPDU according to Equation 3.

Then, instead of determining the number of mid-ambles $N_{MA}$ according to Equation 4 above, the transmitter may determine a number of mid-ambles $N_{MA}$ according to:

$$N_{MA} = \begin{cases} \lfloor (N_{SYM} - 1)/M \rfloor & \text{when Doppler subfield indicates mid-amble exists,} \\ 0 & \text{otherwise.} \end{cases} \qquad \text{Eq. 19}$$

When a receiver receives the HE PPDU, it needs to derive how many OFDM data symbols $N_{SYM}$, that will be decoded to produce data, are being transmitted in the received HE PPDU and what amount of additional time, the Packet Extension duration $T_{PE}$, is being provided for receive processing. Equations for doing so may be derived as follows:

Step B1) the floor function can be eliminated from Equation 19 by restating Equation 19 as shown below using an additional unknown variable $n_0$:

for some $$n_0, 0 \leq n_0 \leq M - 1, \qquad \text{Eq. 20}$$

$$N_{MA} = \frac{N_{SYM} - 1 - n_0}{M} \Rightarrow N_{SYM} = M \cdot N_{MA} + 1 + n_0.$$

Step B2) the floor function can be eliminated from Equation 5 by restating Equation 5 as shown below using an additional unknown variable $\alpha$:
for some $$\alpha, 0 \leq \alpha < 1,$$

$$\left(\frac{\text{L\_LENGTH}+m+3}{3} \times 4 - T_{PA} - N_{MA}T_{MA}\right) / T_{SYM} = \qquad \text{Eq. 21}$$
$$N_{SYM} + b_{PE\text{-}Disambiguity} + \alpha.$$

Step B3) from Step B1 and Step B2, the following equations can be derived:

$$\left(\frac{\text{L\_LENGTH}+m+3}{3} \times 4 - T_{PA} - N_{MA}T_{MA}\right) = \qquad \text{Eq. 22}$$
$$T_{SYM}(M \cdot N_{MA} + 1 + n_0 + b_{PE\text{-}Disambiguity} + \alpha).$$

$$N_{MA} = \frac{\left(\frac{\text{L\_LENGTH}+m+3}{3} \times 4 - T_{PA}\right) - T_{SYM}(1 + n_0 + b_{PE\text{-}Disambiguity} + \alpha)}{T_{MA} + M \cdot T_{SYM}} \qquad \text{Eq. 23}$$

Step B4) from the above, minimum and maximum possible values of $n_0$ and $\alpha$ may be used to determine minimum ($N_{MA\_MIN}$) and maximum ($N_{MA\_MAX}$) possible values for the number of mid-ambles $N_{MA}$:

assume $\alpha = 0$, $\qquad$ Eq. 24

$$n_0 = 0: N_{MA\_MAX} = \frac{\frac{\text{L\_LENGTH}+m+3}{3} \times 4 - T_{PA} - T_{SYM}(1 + b_{PE\text{-}Disambiguity})}{T_{MA} + M \cdot T_{SYM}}$$

assume $\alpha = 1$, $\qquad$ Eq. 25

$$n_0 = M - 1: N_{MA\_MIN} = \frac{\frac{\text{L\_LENGTH}+m+3}{3} \times 4 - T_{PA} - T_{SYM}(1 + b_{PE\text{-}Disambiguity} + M)}{T_{MA} + M \cdot T_{SYM}}$$

and note that:

$$N_{MA\_MIN} < N_{MA} < N_{MA\_MAX} \qquad \text{Eq. 26}$$

Step B5) from the above, determine an equation for $(N_{MA\_MAX} - N_{MA\_MIN})$ to determine the scope of the range of possible values for the number of mid-ambles $N_{MA}$:

$$(N_{MA\_MAX} - N_{MA\_MIN}) = \frac{M \cdot T_{SYM}}{T_{MA} + M \cdot T_{SYM}}, \text{ which is} < 1 \qquad \text{Eq. 27}$$

Because the difference between $N_{MA\_MAX}$ and $N_{MA\_MIN}$ is less than one and $N_{MA\_MAX}$ is greater than $N_{MA\_MIN}$, floor $(N_{MA\_MAX})$=ceiling$(N_{MA\_MIN})$. Relying on this and that the number of mid-ambles $N_{MA}$ must be a positive integer between $N_{MA\_MAX}$ and $N_{MA\_MIN}$, $$N_{MA} = \text{floor } (N_{MA\_MAX}) = \text{ceiling } (N_{MA\_MIN}) \qquad \text{Eq. 28}$$

$$N_{MA} = \left\lfloor \frac{\frac{\text{L\_LENGTH}+m+3}{3} \times 4 - T_{PA} - T_{SYM}(1 + b_{PE\text{-}Disambiguity})}{T_{MA} + M \cdot T_{SYM}} \right\rfloor \qquad \text{Eq. 29}$$
$$= \left\lceil \frac{\frac{\text{L\_LENGTH}+m+3}{3} \times 4 - T_{PA} - T_{SYM}(1 + b_{PE\text{-}Disambiguity} + M)}{T_{MA} + M \cdot T_{SYM}} \right\rceil$$

Accordingly, the number of mid-ambles $N_{MA}$ may be determined without first determining the number of OFDM data symbols $N_{SYM}$ using either the middle or right portion of Equation 29.

In an embodiment in accordance with Equation 29, a process of identifying a number of OFDM data symbols $N_{SYM}$ and a Packet Extension duration $T_{PE}$ from a received HE PPDU first determines a number of mid-ambles $N_{MA}$ when the Doppler subfield indicates that mid-ambles are present in an HE PPDU according to:

$$N_{MA} = \left\lfloor \frac{\frac{\text{L\_LENGTH}+m+3}{3} \times 4 - T_{PA} - T_{SYM}(1 + b_{PE\text{-}Disambiguity})}{T_{MA} + M \cdot T_{SYM}} \right\rfloor \qquad \text{Eq. 30}$$

When the Doppler subfield indicates that mid-ambles are not present in the HE PPDU, the number of mid-ambles $N_{MA}$ is 0. Unlike a process relying on Equation 4, the process using Equation 30 to determine the number of mid-ambles NA does not need to first determine the value $N_{SYM}$ in order to do so.

Once the number of mid-ambles $N_{MA}$ is determined, the process may determine the number of OFDM data symbols $N_{SYM}$ according to Equation 5 and the Packet Extension duration $T_{PE}$ determined according to Equation 6.

In another embodiment in accordance with Equation 29, a process of identifying a number of OFDM data symbols $N_{SYM}$ and a Packet Extension duration $T_{PE}$ from a received HE PPDU determines a number of mid-ambles $N_{MA}$ when the Doppler subfield indicates that mid-ambles are present in an HE PPDU according to:

$$N_{MA} = \left\lceil \frac{\frac{\text{L\_LENGTH}+m+3}{3} \times 4 - T_{PA} - T_{SYM}(1 + b_{PE\text{-}Disambiguity} + M)}{T_{MA} + M \cdot T_{SYM}} \right\rceil \qquad \text{Eq. 31}$$

When the Doppler subfield indicates that mid-ambles are not present in the HE PPDU, the number of mid-ambles $N_{MA}$ is 0. The process using Equation 31 to determine the number of mid-ambles $N_{MA}$ does not need to first determine the value of $N_{SYM}$ in order to do so.

Once the number of mid-ambles $N_{MA}$ is determined, the process may determine the number of OFDM data symbols $N_{SYM}$ according to Equation 5 and the Packet Extension duration $T_{PE}$ determined according to Equation 6.

Figure 20:
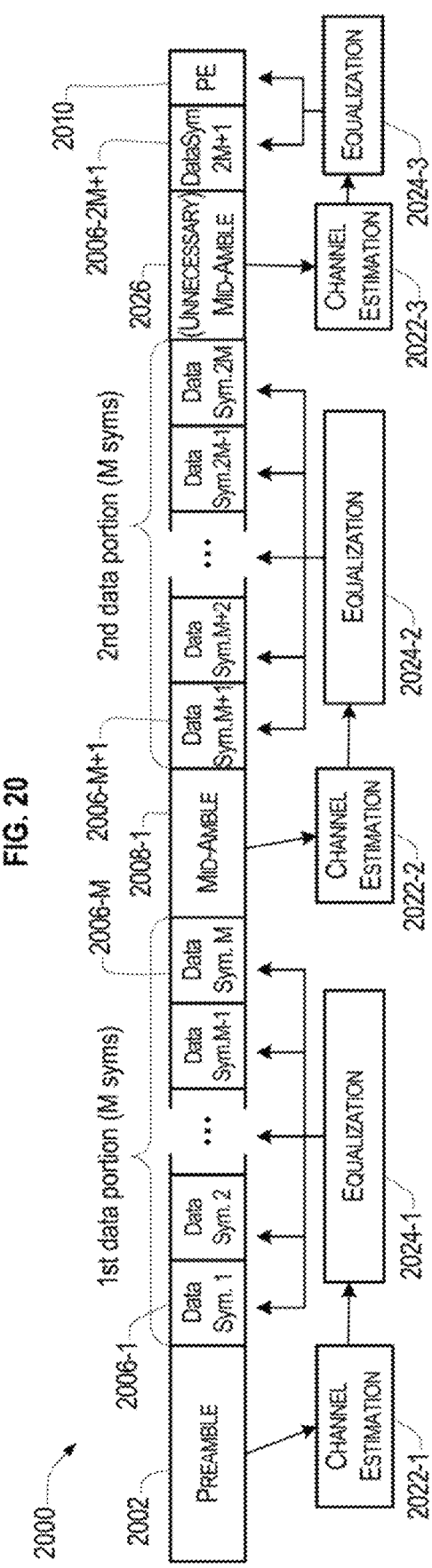
FIG. 20 illustrates a PPDU including mid-ambles according to another embodiment.

Generalizing from FIG. 18, FIG. 20 illustrates a PPDU 2000 according to an embodiment. Elements of FIG. 20 having reference characters of the form 20XX or 20XX-X are similar to elements of FIG. 17 having respective reference characters of the form 17XX or 17XX-X, and descriptions thereof are omitted for brevity.

The illustrative PPDU 2000 includes $2M+\beta$/OFDM data symbols, where M is the mid-amble periodicity. In the example shown, $\beta=1$. As a result, a mid-amble 2008-1 is inserted after the first M OFDM data symbols, and because the embodiment was according to Equation 4 (or Equation 19), another (unnecessary) mid-amble 2026 before the last OFDM data symbol 2006-2M+1 and the PE 2010. The mid-amble 2026 is unnecessary because the equalization necessary to decode the last OFDM data symbol 2006-2M+1 is probably substantially the same as the equalization needed to receive the second-to-the-last OFDM data symbol 2006-2M and the Packet Extension (PE) 2010 is not an OFDM symbols to be decoded. Therefore, the third channel estimation 2022-3 and third equalization 2024-3 are not needed, which means the unnecessary mid-amble 2026 is not needed.

In an embodiment, to prevent the insertion of the unnecessary mid-amble 2026, a transmitter determines the number of OFDM symbols $N_{SYM}$ used for encoding data symbols in a HE PPDU according to Equation 1 or Equation 2, as appropriate, and the Length field of the L-SIG of the HE PPDU according to Equation 3.

Then, instead of determining the number of mid-ambles $N_{MA}$ according to Equations 4 or 19, above, the transmitter may determine a number of mid-ambles $N_{MA}$ according to:

$$N_{MA} = \begin{cases} \lfloor (N_{SYM} - \beta - 1)/M \rfloor & \text{when Doppler subfield} \\ & \text{indicates mid-ambles,} \\ 0 & \text{otherwise.} \end{cases} \quad \text{Eq. 19A}$$

thereby preventing the insertion of another mid-amble when only $M+\beta$ OFDM data symbols remain to be transmitted, $0 \le \beta < M$ after a last mid-amble. In an embodiment, $\beta=1$. Equivalently, because for any positive integers y and z, $\lfloor y/z \rfloor = \lceil (y+1)/z \rceil - 1$, Equation 19A is equivalent to:

$$N_{MA} = \begin{cases} \lceil (N_{SYM} - \beta)/M \rceil - 1 & \text{when Doppler subfield} \\ & \text{indicates mid-ambles,} \\ 0 & \text{otherwise.} \end{cases} \quad \text{Eq. 19B}$$

When a receiver receives the HE PPDU, it needs to derive how many OFDM data symbols, $N_{SYM}$, are being transmitted in the HE-PPDU and what amount of additional time, the PE duration $T_{PE}$, has been provided for receive processing. Equations for doing so may be derived as follows:

Step C1) the ceiling function can be eliminated from Equation 19B by restating Equation 19B as shown below using an additional unknown variable $n_0$:

for some $$n_0, \; 0 \le n_0 \le M - 1,$$

$$N_{MA} = \frac{N_{SYM} - \beta + n_0}{M} - 1 \Rightarrow N_{SYM} = M \cdot N_{MA} + M + \beta - n_0. \quad \text{Eq. 20B}$$

Step C2) the floor function can be eliminated from Equation 5 by restating Equation 5 as shown below using an additional unknown variable $\alpha$:

for some $$\alpha, \; 0 \le \alpha < 1,$$

$$\left( \frac{L\_LENGTH + m + 3}{3} \times 4 - T_{PA} - N_{MA} T_{MA} \right) / T_{SYM} = \quad \text{Eq. 21B}$$

$$N_{SYM} + b_{PE\text{-}Disambiguity} + \alpha.$$

Step C3) from Step C1 and Step C2, the following equations can be derived:

$$\left( \frac{L\_LENGTH + m + 3}{3} \times 4 - T_{PA} - N_{MA} T_{MA} \right) = \quad \text{Eq. 22B}$$

$$T_{SYM} (M \cdot N_{MA} + M + \beta - n_0 + b_{PE\text{-}Disambiguity} + \alpha).$$

$$N_{MA} = \frac{\left( \frac{L\_LENGTH + m + 3}{3} \times 4 - T_{PA} \right) - T_{SYM}(M + \beta - n_0 + b_{PE\text{-}Disambiguity} + \alpha)}{T_{MA} + M \cdot T_{SYM}} \quad \text{Eq. 23B}$$

Step C4) from the above, minimum and maximum possible values of $n_0$ and $\alpha$ may be used to determine minimum ($N_{MA\_MIN}$) and maximum ($N_{MA\_MAX}$) possible values for the number of mid-ambles $N_{MA}$:

assume $\alpha = 1$, $\quad$ Eq. 24B $$n_0 = M - 1: \; N_{MA\_MAX} = \frac{\frac{L\_LENGTH + m + 3}{3} \times 4 - T_{PA} - T_{SYM}(1 + \beta + b_{PE\text{-}Disambiguity})}{T_{MA} + M \cdot T_{SYM}}$$

assume $\alpha = 0$, $\quad$ Eq. 25B $$n_0 = 0: \; N_{MA\_MIN} = \frac{\frac{L\_LENGTH + m + 3}{3} \times 4 - T_{PA} - T_{SYM}(1 + b_{PE\text{-}Disambiguity} + \beta + M)}{T_{MA} + M \cdot T_{SYM}}$$

and note that:

$$N_{MA\_MIN} < N_{MA} < N_{MA\_MAX} \quad \text{Eq. 26B}$$

Step C5) from the above, determine an equation for $(N_{MA\_MAX} - N_{MA\_MIN})$ to determine the scope of the range of possible values for the number of mid-ambles $N_{MA}$:

$$(N_{MA\_MAX} - N_{MA\_MIN}) = \frac{M \cdot T_{SYM}}{T_{MA} + M \cdot T_{SYM}}, \quad \text{Eq. 27B}$$

which is $< 1$

Because the difference between $N_{MA\_MAX}$ and $N_{MA\_MIN}$ is less than one and $N_{MA\_MAX}$ is greater than $N_{MA\_MIN}$, floor $(N_{MA\_MAX})$ = ceiling$(N_{MA\_MIN})$. Relying on this and that the number of mid-ambles $N_{MA}$ must be a positive integer between $N_{MA\_MAX}$ and $N_{MA\_MIN}$, $$N_{MA} = \text{floor}(N_{MA\_MAX}) = \text{ceiling}(N_{MA\_MIN}) \qquad \text{Eq. 28B}$$

$$N_{MA} = \left\lfloor \frac{\frac{L\_LENGTH + m + 3}{3} \times 4 - T_{PA} -}{T_{MA} + M \cdot T_{SYM}} \right\rfloor = \left\lceil \frac{\frac{L\_LENGTH + m + 3}{3} \times 4 - T_{PA} -}{T_{MA} + M \cdot T_{SYM}} \right\rceil \qquad \text{Eq. 29B}$$

Accordingly, the number of mid-ambles $N_{MA}$ may be determined without first determining the number of OFDM data symbols $N_{SYM}$.

In an embodiment in accordance with Equation 29B, a process of identifying a number of OFDM data symbols $N_{SYM}$ and a Packet Extension duration $T_{PE}$ from a HE PPDU being received first determines a number of mid-ambles NA when the Doppler subfield indicates that mid-ambles are present in an HE PPDU according to:

$$N_{MA} = \left\lfloor \frac{\frac{L\_LENGTH + m + 3}{3} \times 4 - T_{PA} -}{T_{MA} + M \cdot T_{SYM}} \right\rfloor \qquad \text{Eq. 30B}$$

When the Doppler subfield indicates that mid-ambles are not present in the HE PPDU, the number of mid-ambles $N_{MA}$ is 0. Unlike a process relying on Equation 4, the process using Equation 30B to determine the number of mid-ambles $N_{MA}$ does not need to first determine the value of $N_{SYM}$ in order to do so.

Once the number of mid-ambles $N_{MA}$ is determined, the process may determine the number of OFDM data symbols $N_{SYM}$ according to Equation 5 and the Packet Extension duration $T_{PE}$ may be determined according to Equation 6.

In another embodiment in accordance with Equation 29B, a process of identifying a number of OFDM data symbols $N_{SYM}$ and a Packet Extension duration $T_{PE}$ from a received HE PPDU determines a number of mid-ambles $N_{MA}$ when the Doppler subfield indicates that mid-ambles are present in an HE PPDU according to:

$$N_{MA} = \left\lceil \frac{\frac{L\_LENGTH + m + 3}{3} \times 4 - T_{PA} -}{T_{MA} + M \cdot T_{SYM}} \right\rceil \qquad \text{Eq. 31B}$$

When the Doppler subfield indicates that mid-ambles are not present in the HE PPDU, the number of mid-ambles $N_{MA}$ is 0. The process using Equation 31B to determine the number of mid-ambles $N_{MA}$ does not need to first determine the value of $N_{SYM}$ in order to do so.

Once the number of mid-ambles $N_{MA}$ is determined, the process may determine the number of OFDM data symbols $N_{SYM}$ according to Equation 5 and the Packet Extension duration $T_{PE}$ may be determined according to Equation 6.

For example, given $\beta=0$, each number of mid-ambles $N_{MA}$ from Eq.1, Eq.3 and Eq.4 provides exactly the same value at the TX side. Equations 19 and 19B generate the same value for the number of mid-ambles $N_{MA}$ at the receive side.

For another example, given $\beta=1$, at the TX side, substituting in 1 for 0 in Equation 19B gives:

$$N_{MA} = \begin{cases} \lceil (N_{SYM} - 1)/M \rceil - 1 & \text{when Doppler subfield indicates mid-ambles,} \\ 0 & \text{otherwise.} \end{cases} \qquad \text{Eq. 19C}$$

and at the receive side, when $\beta=1$, the number of mid-ambles $N_{MA}$ is determined by either:

$$N_{MA} = \left\lfloor \frac{\frac{L\_LENGTH + m + 3}{3} \times 4 - T_{PA} -}{T_{MA} + M \cdot T_{SYM}} \right\rfloor \qquad \text{Eq. 30C}$$

or by $$N_{MA} = \left\lceil \frac{\frac{L\_LENGTH + m + 3}{3} \times 4 - T_{PA} -}{T_{MA} + M \cdot T_{SYM}} \right\rceil \qquad \text{Eq. 31C}$$

Note that when $\beta=1$, the number of mid-ambles $N_{MA}$ is 0 or a positive integer according to the definition wherein the number of mid-ambles $N_{MA}$ is the number of mid-amble inserted on every M except two cases. There is no mid-amble inserted after the last OFDM data symbol if mod $(N_{SYM}, N_{MA})=0$, and at the end of an HE PPDU, if mod $(N_{SYM}, N_{MA})=1$, there is also no mid-amble inserted before the last OFDM data symbol. In an embodiment, 0 is a predetermined value.

In another embodiment, a process determines a number of OFDM data symbols $N_{SYM}$ and a Packet-extension duration $T_{PE}$ for a received HE PPDU as follows:

When Doppler information for the HE PPDU indicates that one or more mid-ambles exist in the HE PPDU, the process determines a number of mid-ambles $N_{MA}$ according to:

$$N_{MA} = \left\lfloor \frac{\left\lfloor \left( \frac{L\_LENGTH + m + 3}{3} \times 4 - T_{PA} \right) / T_{SYM} \right\rfloor - b_{PE\text{-}Disambiguity} + 1}{T_{MA}/T_{SYM} + M} \right\rfloor. \qquad \text{Eq. 32}$$

or according to:

$$N_{MA} = \left\lceil \frac{\left\lfloor \left( \frac{L\_LENGTH + m + 3}{3} \times 4 - T_{PA} \right) / T_{SYM} \right\rfloor - b_{PE\text{-}Disambiguity} + 1 - M}{T_{MA}/T_{SYM} + M} \right\rceil \qquad \text{Eq. 33}$$

Otherwise, when the Doppler information indicates no mid-ambles exist in the HE PPDU, the number of mid-ambles $N_{MA}=0$.

The process then determines an estimated number of OFDM symbols $T\_N_{SYM}$ used to decode data according to either:

$$T\_N_{SYM} = \left\lfloor \left[\left(\frac{L\_LENGTH + m + 3}{3} \times 4 - T_{PA}\right)\bigg/ T_{SYM}\right] - b_{PE\text{-}Disambiguity} - \left\lfloor \frac{T_{MA}}{T_{SYM}} \cdot \left\lfloor \frac{\left\lfloor \left(\frac{L\_LENGTH + m + 3}{3} \times 4 - T_{PA}\right)\bigg/ T_{SYM}\right\rfloor - b_{PE\text{-}Disambiguity} + 1 - M}{T_{MA}/T_{SYM} + M} \right\rfloor \right\rfloor \right\rfloor \quad \text{Eq. 34}$$

or $$T\_N_{SYM} = \left\lfloor \left[\left(\frac{L\_LENGTH + m + 3}{3} \times 4 - T_{PA}\right)\bigg/ T_{SYM}\right] - b_{PE\text{-}Disambiguity} - \left\lfloor \frac{T_{MA}}{T_{SYM}} \cdot \left\lfloor \frac{\left\lfloor \left(\frac{L\_LENGTH + m + 3}{3} \times 4 - T_{PA}\right)\bigg/ T_{SYM}\right\rfloor - b_{PE\text{-}Disambiguity} + 1}{T_{MA}/T_{SYM} + M} \right\rfloor \right\rfloor \right\rfloor \quad \text{Eq. 35}$$

The estimated number of OFDM symbols $T\_N_{SYM}$ needs to be verified by determining whether $T\_T_{PE}$ is less than 0 to obtain a final value for $N_{SYM}$.

$$T\_T_{PE} = \left\lfloor \frac{\left(\frac{L\_LENGTH + m + 3}{3} \times 4 - T_{PA} - N_{MA}T_{MA}\right) - T\_N_{SYM}T_{SYM}}{4} \right\rfloor \times 4 \quad \text{Eq. 36}$$

$$N_{SYM} = \begin{cases} T\_N_{SYM} - 1 & \text{when } T\_T_{PE} < 0, \\ T\_N_{SYM} & \text{otherwise.} \end{cases} \quad \text{Eq. 37}$$

The PE duration $T_{PE}$ is then determined according to Equation 6, above.

The equations 34-37 above, used to determine $T\_N_{SYM}$ and $N_{SYM}$ above, are derived as follows in light of FIG. 19.

Figure 19:
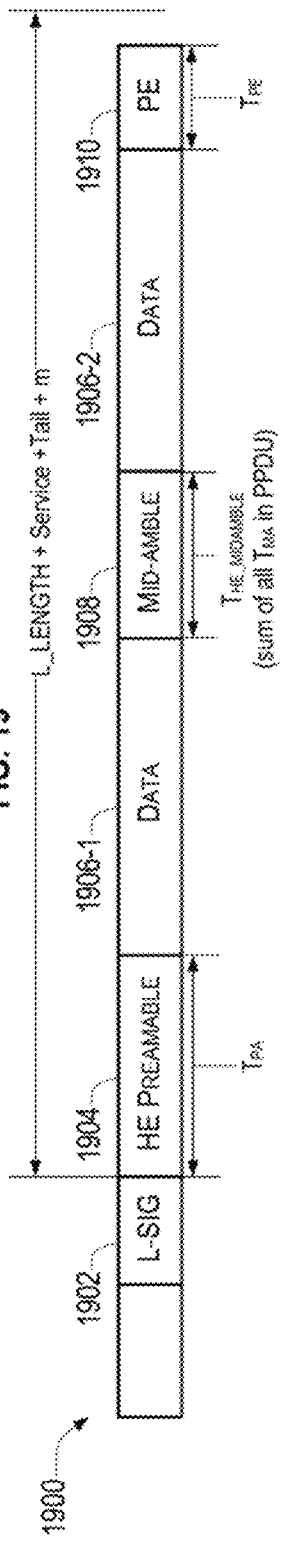
FIG. 19 illustrates features of a PPDU including mid-ambles according to another embodiment.

FIG. 19 illustrates features of a PPDU 1900 including a mid-amble 1908 according to an embodiment. The PPDU 1900 also includes an L-SIG field 1902, an HE Preamble 1904, first and second portions of a Data field 1906-1 and 1906-2, and a Packet Extension (PE) 1910. A duration of the HE Preamble 1904 is indicated by $T_{PA}$. A combined duration of the mid-ambles of the PPDU is indicated by $T_{HE\_MIDAMBLE}$. A duration of the PE 1910 is indicated by $T_{PE}$.

A length from the end of the L-SIG field 1902 to beyond an end of the PPDU is equal to a value L_LENGTH of a length field of the L-SIG field 1902 plus a number of Service bits (16) at the beginning of the first portion of the Data field 1906-1 plus a number of Tail bits (6) at the end of the last (here, second) portion of the Data field 1906-2 plus m, m is 1 for an HE MU PPDU or HE ER SU PPDU, and 2 otherwise.

In order to get $N_{SYM}$ at the receive side, the equation below is used when Doppler information is set to the first state (e.g. 1) which indicates that the Mid-Amble exists:

$$\frac{L\_LENGTH + m + 3}{3} \times 4 = \quad \text{Eq. 38}$$

$$T_{PA} + N_{SYM}T_{SYM} + N_{MA}T_{MA} + T_{PE} + T_{SYM}b_{PE\text{-}Disambiguity} + \alpha$$

$$0 \leq \alpha < 4, \; 0 \leq T_{PE} + \alpha < T_{SYM}$$

Step D1) from Equation 38 it follows that:

$$N_{SYM}T_{SYM} + N_{MA}T_{MA} + T_{SYM}b_{PE\text{-}Disambiguity} = \quad \text{Eq. 39}$$

$$\frac{L\_LENGTH + m + 3}{3} \times 4 - T_{PA} - (T_{PE} + \alpha)$$

$$\left\lfloor N_{SYM} + N_{MA}\frac{T_{MA}}{T_{SYM}} + b_{PE\text{-}Disambiguity}\right\rfloor = \quad \text{Eq. 40}$$

$$\left\lfloor \frac{\frac{L\_LENGTH + m + 3}{3} \times 4 - T_{PA} - (T_{PE} + \alpha)}{T_{SYM}}\right\rfloor$$

$$N_{SYM} + \left\lfloor N_{MA}\frac{T_{MA}}{T_{SYM}}\right\rfloor = \quad \text{Eq. 41}$$

$$\left\lfloor \frac{\frac{L\_LENGTH + m + 3}{3} \times 4 - T_{PA}}{T_{SYM}} - \frac{T_{PE} + \alpha}{T_{SYM}}\right\rfloor - b_{PE\text{-}Disambiguity}$$

Because $T_{PE}$ is not known without $N_{SYM}$ in a receiver of an HE PPDU, $((T_{PE}+\alpha)/T_{SYM})$ is temporarily ignored, and the impact of this term will be verified later. As shown in Equation 42, below, $N_{SYM}$ is replaced with $T\_N_{SYM}$ as a temporary number of OFDM data symbol:

$$T\_N_{SYM} + \left\lfloor N_{MA}\frac{T_{MA}}{T_{SYM}}\right\rfloor = \quad \text{Eq. 42}$$

$$\left\lfloor \frac{\frac{L\_LENGTH + m + 3}{3} \times 4 - T_{PA}}{T_{SYM}}\right\rfloor - b_{PE\text{-}Disambiguity}$$

Step D2) from the above:

$$T\_N_{SYM} = M \cdot N_{MA} + n_0, \; 0 \leq n_0 \leq M-1 \quad \text{Eq. 43}$$

Step D3) from Step D1 and Step D2:

$$N_{MA}\frac{T_{MA}}{T_{SYM}} = \left\lfloor \frac{\frac{L\_LENGTH + m + 3}{3} \times 4 - T_{PA}}{T_{SYM}}\right\rfloor - \quad \text{Eq. 44}$$

$$b_{PE\text{-}Disambiguity} - T\_N_{SYM} + \alpha, \; 0 \leq \alpha < 1$$

$$\frac{T\_N_{SYM} - n_0}{M} \cdot \frac{T_{MA}}{T_{SYM}} = \quad \text{Eq. 45}$$

$$\left\lfloor \frac{\frac{L\_LENGTH + m + 3}{3} \times 4 - T_{PA}}{T_{SYM}}\right\rfloor - b_{PE\text{-}Disambiguity} - T\_N_{SYM} + \alpha$$

$$T\_N_{SYM} = \frac{M}{T_{MA}/T_{SYM} + M} \cdot \left(\frac{T_{MA}/T_{SYM}}{M} \cdot n_0 + \left\lfloor \frac{\frac{L\_LENGTH + m + 3}{3} \times 4 - T_{PA}}{T_{SYM}}\right\rfloor - b_{PE\text{-}Disambiguity} + \alpha\right) \quad \text{Eq. 45}$$

Step D4) from Step D2 and Step D3, $$N_{MA} = \frac{T\_N_{SYM} - n_0}{M} \qquad \text{Eq. 46}$$

$$N_{MA} = \frac{1}{T_{MA}/T_{SYM} + M} \cdot \qquad \text{Eq. 47}$$
$$\left( \left\lfloor \frac{\left\lceil \frac{L\_LENGTH + m + 3}{3} \right\rceil \times 4 - T_{PA}}{T_{SYM}} \right\rfloor - b_{PE\text{-}Disambiguty} + \alpha - n_0 \right)$$

$$0 \le \alpha < 1, \, 0 \le n_0 \le M - 1$$

Step D5) find minimum value and maximum value of the number of mid-ambles $N_{MA}$ to find the boundary:

Assuming $\alpha = 1, n_0 = 0$, Eq. 48

$$\text{Max}_{N_{MA}} = \frac{1}{T_{MA}/T_{SYM} + M} \cdot$$
$$\left( \left\lfloor \frac{\left\lceil \frac{L\_LENGTH + m + 3}{3} \right\rceil \times 4 - T_{PA}}{T_{SYM}} \right\rfloor - b_{PE\text{-}Disambiguty} + 1 \right)$$

Assuming $\alpha = 0, n_0 = M - 1$, Eq. 49

$$\text{Min}_{N_{MA}} = \frac{1}{T_{MA}/T_{SYM} + M} \cdot$$
$$\left( \left\lfloor \frac{\left\lceil \frac{L\_LENGTH + m + 3}{3} \right\rceil \times 4 - T_{PA}}{T_{SYM}} \right\rfloor - b_{PE\text{-}Disambiguty} - M + 1 \right)$$

$$\frac{1}{T_{MA}/T_{SYM} + M} \cdot \left( \left\lfloor \frac{\left\lceil \frac{L\_LENGTH + m + 3}{3} \right\rceil \times 4 - T_{PA}}{T_{SYM}} \right\rfloor - \right. \qquad \text{Eq. 50}$$
$$\left. b_{PE\text{-}Disambiguty} - M + 1 \right) < N_{MA} < \frac{1}{T_{MA}/T_{SYM} + M} \cdot$$
$$\left( \left\lfloor \frac{\left\lceil \frac{L\_LENGTH + m + 3}{3} \right\rceil \times 4 - T_{PA}}{T_{SYM}} \right\rfloor - b_{PE\text{-}Disambiguty} + 1 \right)$$

Step D6) check (Max $N_{MA}$–Min $N_{MA}$) to see the range of $N_{MA}$:

$$(\text{Max}N_{MA} - \text{Min}N_{MA}) = \frac{M}{T_{MA}/T_{SYM} + M} < 1 \qquad \text{Eq. 51}$$

Since the number of mid-ambles $N_{MA}$ is supposed to be a positive integer within $0 < (\text{Max}N_{MA} - \text{Min}N_{MA}) < 1$, $N_{NA}$ should be one positive integer, so floor(Max$N_M$)=ceil (Min$N_M$):

$$N_{MA} = \left\lfloor \frac{1}{T_{MA}/T_{SYM} + M} \cdot \right. \qquad \text{Eq. 52}$$
$$\left( \left\lfloor \frac{\left\lceil \frac{L\_LENGTH + m + 3}{3} \right\rceil \times 4 - T_{PA}}{T_{SYM}} \right\rfloor -$$
$$\left. b_{PE\text{-}Disambiguty} + 1 \right) \right\rfloor$$

$$= \left\lceil \frac{1}{T_{MA}/T_{SYM} + M} \cdot \right.$$
$$\left( \left\lfloor \frac{\left\lceil \frac{L\_LENGTH + m + 3}{3} \right\rceil \times 4 - T_{PA}}{T_{SYM}} \right\rfloor -$$
$$\left. b_{PE\text{-}Disambiguty} - M + 1 \right) \right\rceil$$

Then, from the above equations, $$T\_N_{SYM} = \left\lfloor \frac{\left\lceil \frac{L\_LENGTH + m + 3}{3} \right\rceil \times 4 - T_{PA}}{T_{SYM}} \right\rfloor - \qquad \text{Eq. 53}$$
$$b_{PE\text{-}Disambiguty} - \left\lfloor N_{MA} \frac{T_{MA}}{T_{SYM}} \right\rfloor$$

$$T\_N_{SYM} = \qquad \text{Eq. 54}$$
$$\left\lfloor \left( \left\lceil \frac{L\_LENGTH + m + 3}{3} \right\rceil \times 4 - T_{PA} \right) \middle/ T_{SYM} \right\rfloor - b_{PE\text{-}Disambiguty} -$$
$$\left\lfloor \frac{T_{MA}}{T_{SYM}} \cdot \frac{\left\lfloor \left( \left\lceil \frac{L\_LENGTH + m + 3}{3} \right\rceil \times 4 - T_{PA} \right) \middle/ T_{SYM} \right\rfloor -}{T_{MA}/T_{SYM} + M} \right\rfloor$$

Or $$T\_N_{SYM} = \qquad \text{Eq. 55}$$
$$\left\lfloor \left( \left\lceil \frac{L\_LENGTH + m + 3}{3} \right\rceil \times 4 - T_{PA} \right) \middle/ T_{SYM} \right\rfloor - b_{PE\text{-}Disambiguty} -$$
$$\left\lfloor \frac{T_{MA}}{T_{SYM}} \cdot \frac{\left\lfloor \left( \left\lceil \frac{L\_LENGTH + m + 3}{3} \right\rceil \times 4 - T_{PA} \right) \middle/ T_{SYM} \right\rfloor -}{T_{MA}/T_{SYM} + M} \right\rfloor$$

In another embodiment, a process determined the number of OFDM data symbols $N_{SYM}$ and a Packet-extension duration $T_{PE}$ for a received HE PPDU is determined as follows:

When Doppler information for the HE PPDU indicates that one or more mid-ambles exist in the HE PPDU, the process determines a number of mid-ambles $N_{MA}$ according to:

$$N_{MA} = \left\lfloor \frac{\left\lfloor \left( \left\lceil \frac{L\_LENGTH + m + 3}{3} \right\rceil \times 4 - T_{PA} \right) \middle/ T_{SYM} \right\rfloor -}{T_{MA}/T_{SYM} + M} \right\rfloor. \qquad \text{Eq. 56}$$

or according to:

$$N_{MA} = \left\lfloor \frac{\left\lfloor \left( \left\lceil \frac{L\_LENGTH + m + 3}{3} \right\rceil \times 4 - T_{PA} \right) \middle/ T_{SYM} \right\rfloor -}{T_{MA}/T_{SYM} + M} \right\rfloor. \qquad \text{Eq. 56}$$

Otherwise, when the Doppler information indicates no mid-ambles exist in the HE PPDU, the number of mid-ambles $N_{MA}=0$.

The process then determines an estimated number of OFDM symbols $T\_N_{SYM}$ used to decode data according to either:

$$T\_N_{SYM} = \left\lfloor \left( \frac{L\_LENGTH+m+3}{3} \times 4 - T_{PA} \right) \bigg/ T_{SYM} \right\rfloor - b_{PE-Disambiguty} - \left\lfloor \frac{T_{MA}}{T_{SYM}} \cdot \left\lfloor \frac{\left\lfloor \left( \frac{L\_LENGTH+m+3}{3} \times 4 - T_{PA} \right) \bigg/ T_{SYM} \right\rfloor - b_{PE-Disambiguty} - M}{T_{MA}/T_{SYM} + M} \right\rfloor \right\rfloor \quad \text{Eq. 57}$$

or $$T\_N_{SYM} = \left\lfloor \left( \frac{L\_LENGTH+m+3}{3} \times 4 - T_{PA} \right) \bigg/ T_{SYM} \right\rfloor - b_{PE-Disambiguty} - \left\lfloor \frac{T_{MA}}{T_{SYM}} \cdot \left\lfloor \frac{\left\lfloor \left( \frac{L\_LENGTH+m+3}{3} \times 4 - T_{PA} \right) \bigg/ T_{SYM} \right\rfloor - b_{PE-Disambiguty}}{T_{MA}/T_{SYM} + M} \right\rfloor \right\rfloor \quad \text{Eq. 58}$$

The estimated number of OFDM symbols $T\_N_{SYM}$ needs to be verified by determining whether $T\_T_{PE}$ is less than 0 to obtain a final value for $N_{SYM}$.

$$T\_T_{PE} = \left\lfloor \frac{\left( \frac{L\_LENGTH+m+3}{3} \times 4 - T_{PA} - N_{MA}T_{MA} \right) - T\_N_{SYM}T_{SYM}}{4} \right\rfloor \times 4 \quad \text{Eq. 59}$$

$$N_{SYM} = \begin{cases} T\_N_{SYM} - 1 & \text{when } T\_T_{PE} < 0, \\ T\_N_{SYM} & \text{otherwise.} \end{cases} \quad \text{Eq. 60}$$

The PE duration $T_{PE}$ is then determined according to Equation 6, above.

The equations 57-60 above used to determine $T\_N_{SYM}$ and $N_{SYM}$ above are derived as follows: In order to get $N_{SYM}$ at the receive side, the equation below is used when Doppler information is set to the first state (e.g. 1) which indicates that the Mid-Amble exists:

$$\frac{L\_LENGTH+m+3}{3} \times 4 = \quad \text{Eq. 61}$$
$$T_{PA} + N_{SYM}T_{SYM} + N_{MA}T_{MA} + T_{PE} + T_{SYM}b_{PE-Disambiguty} + \alpha$$
$$0 \leq \alpha < 4, 0 \leq T_{PE} + \alpha < T_{SYM}$$

Step E1) from Equation 61 it follows that:

$$N_{SYM}T_{SYM} + N_{MA}T_{MA} + T_{SYM}b_{PE-Disambiguty} = \quad \text{Eq. 62}$$
$$\frac{L\_LENGTH+m+3}{3} \times 4 - T_{PA} - (T_{PE} + \alpha)$$

$$\left\lfloor N_{SYM} + N_{MA}\frac{T_{MA}}{T_{SYM}} + b_{PE-Disambiguity} \right\rfloor = \quad \text{Eq. 63}$$
$$\left\lfloor \frac{\frac{L\_LENGTH+m+3}{3} \times 4 - T_{PA} - (T_{PE} + \alpha)}{T_{SYM}} \right\rfloor$$

$$N_{SYM} + \left\lfloor N_{MA}\frac{T_{MA}}{T_{SYM}} \right\rfloor = \quad \text{Eq. 64}$$
$$\left\lfloor \frac{\frac{L\_LENGTH+m+3}{3} \times 4 - T_{PA}}{T_{SYM}} - \frac{T_{PE} + \alpha}{T_{SYM}} \right\rfloor - b_{PE-Disambiguity}$$

Since $T_{PE}$ is not known without $N_{SYM}$ in a receiver of an HE PPDU, $((T_{pE}+\alpha)/T_{SYM})$ is temporarily ignored, and the impact of this term will be verified later. As shown in Equation 42, below, $N_{SYM}$ is replaced with $T\_N_{SYM}$ as a temporary number of OFDM data symbol:

$$T\_N_{SYM} + \left\lfloor N_{MA}\frac{T_{MA}}{T_{SYM}} \right\rfloor = \quad \text{Eq. 65}$$
$$\left\lfloor \frac{\frac{L\_LENGTH+m+3}{3} \times 4 - T_{PA}}{T_{SYM}} \right\rfloor - b_{PE-Disambiguity}$$

Step E2) from the above:

$$T\_N_{SYM} = M \cdot N_{MA} + n_0 + 1, \, 0 \leq n_0 \leq M-1 \quad \text{Eq. 66}$$

Step E3) from Step E1 and Step E2:

$$N_{MA}\frac{T_{MA}}{T_{SYM}} = \left\lfloor \frac{\frac{L\_LENGTH+m+3}{3} \times 4 - T_{PA}}{T_{SYM}} \right\rfloor - \quad \text{Eq. 67}$$
$$b_{PE-Disambiguity} - T\_N_{SYM} + \alpha, \, 0 \leq \alpha < 1$$

$$\frac{T\_N_{SYM} - n_0 - 1}{M} \cdot \frac{T_{MA}}{T_{SYM}} = \left\lfloor \frac{\frac{L\_LENGTH+m+3}{3} \times 4 - T_{PA}}{T_{SYM}} \right\rfloor - \quad \text{Eq. 68}$$
$$b_{PE-Disambiguity} - T\_N_{SYM} + \alpha$$

$$T\_N_{SYM} = \frac{M}{T_{MA}/T_{SYM} + M} \cdot \Bigg( \frac{T_{MA}/T_{SYM}}{M} \cdot (n_0 + 1) + \quad \text{Eq. 69}$$
$$\left\lfloor \frac{\frac{L\_LENGTH+m+3}{3} \times 4 - T_{PA}}{T_{SYM}} \right\rfloor - b_{PE-Disambiguity} + \alpha \Bigg)$$

Step E4) from Step E2 and Step E3, $$N_{MA} = \frac{T\_N_{SYM} - 1 - n_0}{M} \quad \text{Eq. 70}$$

$$N_{MA} = \frac{1}{T_{MA}/T_{SYM} + M} \cdot \Bigg( \left\lfloor \frac{\frac{L\_LENGTH+m+3}{3} \times 4 - T_{PA}}{T_{SYM}} \right\rfloor - \quad \text{Eq. 71}$$
$$b_{PE-Disambiguity} + \alpha - n_0 - 1 \Bigg)$$

$$0 \leq \alpha < 1, 0 \leq n_0 \leq M - 1$$

Step E5) find minimum value and maximum value of $N_{MA}$ to find the boundary:

$$\text{Max}_{N_{MA}} = \frac{1}{T_{MA}/T_{SYM} + M} \cdot \left(\left\lfloor \frac{\frac{L\_LENGTH + m + 3}{3} \times 4 - T_{PA}}{T_{SYM}} \right\rfloor - b_{PE\text{-}Disambiguity}\right) \quad \text{Assuming } \alpha = 1, n_0 = 0, \quad \text{Eq. 72}$$

$$\text{Min}_{N_{MA}} = \frac{1}{T_{MA}/T_{SYM} + M} \cdot \left(\left\lfloor \frac{\frac{L\_LENGTH + m + 3}{3} \times 4 - T_{PA}}{T_{SYM}} \right\rfloor - b_{PE\text{-}Disambiguity} - M\right) \quad \text{Assuming } \alpha = 0, n_0 = M - 1, \quad \text{Eq. 73}$$

$$\frac{1}{T_{MA}/T_{SYM} + M} \cdot \left(\left\lfloor \frac{\frac{L\_LENGTH + m + 3}{3} \times 4 - T_{PA}}{T_{SYM}} \right\rfloor - b_{PE\text{-}Disambiguity} - M\right) < \quad \text{Eq. 74}$$

$$N_{MA} < \frac{1}{T_{MA}/T_{SYM} + M} \cdot \left(\left\lfloor \frac{\frac{L\_LENGTH + m + 3}{3} \times 4 - T_{PA}}{T_{SYM}} \right\rfloor - b_{PE\text{-}Disambiguity}\right)$$

Step E6) Step D6) check $(\text{Max}N_{MA} - \text{Min}N_{MA})$ to see the range of $N_{MA}$:

$$(\text{Max}N_{MA} - \text{Min}N_{MA}) = \frac{M}{T_{MA}/T_{SYM} + M} < 1 \quad \text{Eq. 75}$$

Since $N_{NA}$ is supposed to be a positive integer within $0 < (\text{Max}N_{MA} - \text{Min}N_{MA}) < 1$, $N_{MA}$ should be a positive integer, so floor($\text{Max}N_{MA}$)=ceil($\text{Min}N_{MA}$):

$$N_{MA} = \left\lfloor \frac{1}{T_{MA}/T_{SYM} + M} \cdot \left(\left\lfloor \frac{\frac{L\_LENGTH + m + 3}{3} \times 4 - T_{PA}}{T_{SYM}} \right\rfloor - b_{PE\text{-}Disambiguity}\right) \right\rfloor \quad \text{Eq. 76}$$

$$= \left\lceil \frac{1}{T_{MA}/T_{SYM} + M} \cdot \left(\left\lfloor \frac{\frac{L\_LENGTH + m + 3}{3} \times 4 - T_{PA}}{T_{SYM}} \right\rfloor - b_{PE\text{-}Disambiguity} - M\right) \right\rceil$$

Then, from the above equations, $$T\_N_{SYM} = \left\lfloor \frac{\frac{L\_LENGTH + m + 3}{3} \times 4 - T_{PA}}{T_{SYM}} \right\rfloor - b_{PE\text{-}Disambiguity} - \left\lfloor N_{MA} \frac{T_{MA}}{T_{SYM}} \right\rfloor, \text{ and} \quad \text{Eq. 77}$$

$$T\_N_{SYM} = \left\lfloor \left(\frac{L\_LENGTH + m + 3}{3} \times 4 - T_{PA}\right)/T_{SYM} \right\rfloor - b_{PE\text{-}Disambiguity} - \left\lfloor \frac{T_{MA}}{T_{SYM}} \cdot \frac{\left\lfloor \left(\frac{L\_LENGTH + m + 3}{3} \times 4 - T_{PA}\right)/T_{SYM} \right\rfloor - b_{PE\text{-}Disambiguity} - M}{T_{MA}/T_{SYM} + M} \right\rfloor, \quad \text{Eq. 78}$$

or $$T\_N_{SYM} = \left\lfloor \left(\frac{L\_LENGTH + m + 3}{3} \times 4 - T_{PA}\right)/T_{SYM} \right\rfloor - b_{PE\text{-}Disambiguity} - \left\lfloor \frac{T_{MA}}{T_{SYM}} \cdot \frac{\left\lfloor \left(\frac{L\_LENGTH + m + 3}{3} \times 4 - T_{PA}\right)/T_{SYM} \right\rfloor - b_{PE\text{-}Disambiguity}}{T_{MA}/T_{SYM} + M} \right\rfloor. \quad \text{Eq. 79}$$

In another embodiment of the invention, when an HE PPDU is received wherein the Doppler information is set to indicate that one or more mid-ambles exist, if signal loss occurs during reception prior to completion of reception of the PSDU, the error condition PHYRXEND.indication(CarrierLost) shall be reported to the MAC. After waiting for the end of the PPDU as determined by Equation 80, below, the PHY shall set the PHY-CCA.indication (IDLE) primitive and return to the RX IDLE state.

$$RXTIME = 20 + T_{PA} + N_{SYM}T_{SYM} + N_{MA}T_{MA} + T_{PE} + SE$$

$$T_{MA} = N_{HE\text{-}LTF}T_{HE\text{-}LTF} + (T_{HE\text{-}STF}) \quad \text{Eq. 80}$$

Note that the duration of HE-STF $T_{HE\text{-}STF}$ could be omitted from Equation 20.

Figure 21:
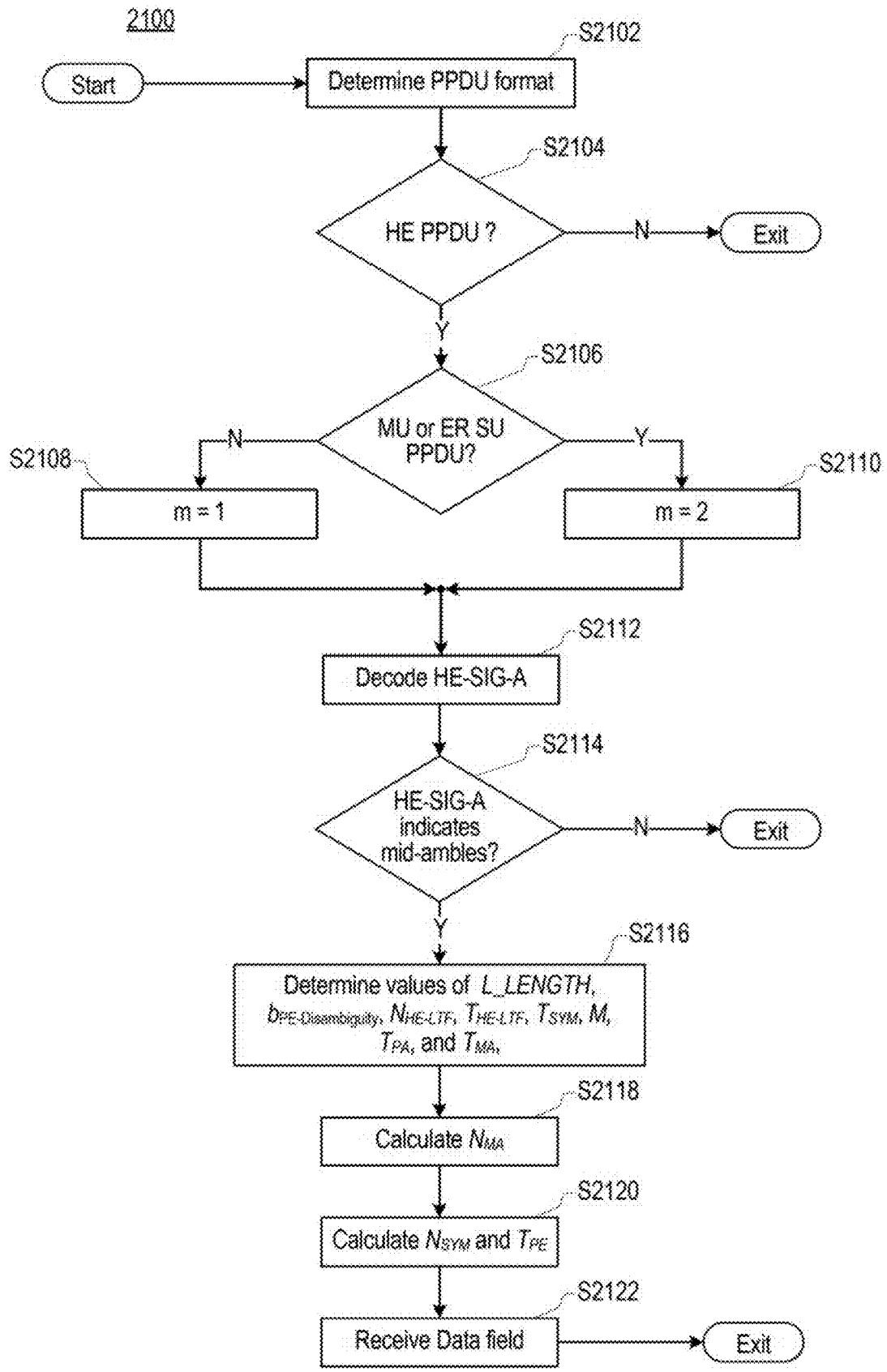
FIG. 21 illustrates a process, according to an embodiment, for receiving a PPDU having a data field that includes mid-ambles.

FIG. 21 illustrates a process 2100, according to an embodiment, for receiving a PPDU having a data field that includes mid-ambles. The symbols may be symbols in a data field of the PPDU into which mid-ambles are inserted. The process 2100 may be performed by a wireless device including a receiver, and the wireless device may include a processor configured to perform the process 2100.

At S2102, the process 2100 determines a format of a PPDU being received. Determining the format of the PPDU being received may include receiving a first four symbols starting with L-STF of the PPDU being received, determining a modulation method of the third and fourth symbols of the received symbols, and determining whether the contents of the fourth symbol is the same as the contents of the third symbol. The third symbol may be a symbol of a Legacy Signal (L-Sig) field.

When the third and fourth symbols are modulated using BPSK, the third symbol is an L-SIG field symbol, and the fourth symbol carries a duplicate of the contents of the L-SIG field, the PPDU being received is an HE PPDU, and determining the format may further include receiving fifth and sixth symbols, and determining the format of the PPDU being received according to a value of a Length field of the L-SIG field modulo 3 and the modulation methods of fifth and sixth symbols, as described with respect to FIG. 12.

At S2104, the process 2100 determines whether the PPDU being received is an HE PPDU. In response to determining that the PPDU being received is an HE PPDU, at S2104 the process 2100 proceeds to S2106; otherwise the process 2100 exits.

At S2106, the process 2100 determines whether the PPDU being received is an HE Multi-User (MU) or HE Extended Range Single User (ER SU) PPDU. In response to determining that the PPDU being received is either an HE MU PPDU or an HE ER SU PPDU, at S2106 the process 2100 proceeds to S2110; otherwise the process 2100 proceeds to S2108.

At S2108, the process S2100 sets a modifier m to 1 in response to the PPDU being received being neither an HE MU PPDU nor an HE ER SU PPDU, then proceeds to S2112.

At S2110, the process S2100 sets a modifier m to 2 in response to the PPDU being received being either an HE MU PPDU or an HE ER SU PPDU, then proceeds to S2112.

At S2112, the process S2100 decodes an HE Signal A (HE-SIG-A) field. When the PPDU being received is an HE ER SU PPDU, decoding the HE-SIG-A field includes receiving and decoding the fifth through eighth symbols of the PPDU being received. When the PPDU being received is an HE MU PPDU, an HE TB PPDU, or an HE SU PPDU, decoding the HE-SIG-A field includes receiving and decoding the fifth through sixth symbols of the PPDU being received.

At S2114, the process S2100 determines whether the HE-SIG-A field indicates that the PPDU being received include mid-ambles. In an embodiment, the process S2100 determines that the PPDU being received includes mid-ambles in response to a Doppler field of the HE-SIG-A field has a value (for example, 1) corresponding to a first state, and determines that the PPDU being received does not include mid-ambles when the Doppler field does not have the value corresponding to the first state (i.e., has a value other than the value corresponding to the first state.)

In response to determining that the PPDU being received includes mid-ambles, at S2114 the process 2100 proceeds to S2116; otherwise the process 2100 exits.

At S2116, the process 2100 determines values of an L-SIG Length field L_LENGTH, a Packet Extension (PE) Disambiguity bit $b_{PE\text{-}Disambiguity}$, an HE-LTF duration $T_{HE\text{-}LTF}$, a preamble duration $T_{PA}$, a mid-amble duration $T_{MA}$, a duration of a symbol of a data field of the PPDU being received $T_{SYM}$ (hereinafter, data symbol duration $T_{SYM}$), and a mid-amble periodicity M.

The process 2100 determines the value of the L-SIG Length field L_LENGTH using the received L-SIG field of the PPDU being received. The process 2100 determines the values of the PE Disambiguity bit $b_{PE\text{-}Disambiguity}$, the mid-amble periodicity M, and the data symbol duration $T_{SYM}$ using information in the HE-SIG-A field in accordance with an applicable standard. In an embodiment, the applicable standard is the IEEE Std 802.11ax or a successor thereto.

The process 2100 determines the HE-LTF duration $T_{HE\text{-}LTF}$ corresponding to the duration of HE-LTFs included in the PPDU being received using information in the HE-SIG-A field in accordance with the applicable standard. As used herein, the HE-LTF duration $T_{HE\text{-}LTF}$ includes a duration of a guard interval included in each HE-LTF.

The process 2100 determines the value of the preamble duration $T_{PA}$ as being equal to a sum of a duration of the RL-SIG field (4 μs), a duration of the HE-SIG-A field (16 μs for an HE ER SU PPDU, 8 μs otherwise), a duration of an HE-SIG-B field if present (variable), a duration of an HE-STF (8 μs for an HE TB PPDU, 4 μs otherwise), and the combined durations of one or more HE-LTFs immediately following the HE-STF (hereinafter, the number of which is referred to as a number of HE-LTFs $N_{HE\text{-}LTF}$). The process 2100 determines the number of HE-LTFs $N_{HE\text{-}LTF}$ using information in the HE-SIG-A field in accordance with the applicable standard.

The process 2100 determines the value of the mid-amble duration $T_{MA}$ according to the product of the number of HE-LTFs $N_{HE\text{-}LTF}$ and the HE-LTF duration $T_{HE\text{-}LTF}$, as prescribed in the applicable standard:

$$T_{MA} = N_{HE\text{-}LTF} \cdot T_{HE\text{-}LTF} \qquad \text{Eq. 81}$$

At S2118, the process 2100 determines a value of a number of mid-ambles $N_{MA}$ using the values determined at S2116. In an embodiment, the value of the number of mid-ambles $N_{MA}$ is determined according to Equation 30B, above, using a value of β prescribed by the applicable standard, wherein β is an integer value greater than or equal to zero indicating a number of data symbols in excess of the mid-amble periodicity M allowed at the end of a data field without requiring the insertion of another mid-amble. In an embodiment, the value of the number of mid-ambles $N_{MA}$ is determined according to Equation 31B, above, using the value of β prescribed by the applicable standard. In embodiments, the value of β is 0. In other embodiments, the value of β is 1.

At S2120, the process 2100 determines a value of number of data symbols $N_{SYM}$ and a value of a PE duration $T_{PE}$. In an embodiment, the process 2100 determines the value of the number of data symbols $N_{SYM}$ according to Equation 5, above, and then determines the value of the PE duration $T_{PE}$ according to Equation 6, above.

At 2122, the process 2100 receives a data field of the PPDU being received using the information determined in S2102 through S2120. Receiving the data field may include iteratively receiving a number of data symbols equal to the mid-amble periodicity M and a mid-amble that immediately follows the data symbols until the number of mid-ambles received is equal to the number of mid-ambles $N_{MA}$ determined at S2118. Each mid-amble consists of $N_{HE\text{-}LTF}$ HE-LTFs.

Once the iterations are complete, the remaining data symbols are then received. The process 2100 then exits. The number of remaining data symbols $N_{remain}$ is $$N_{remain} = N_{SYM} - (M \cdot N_{MA}) \qquad \text{Eq. 82}$$

FIG. 22 illustrates a process 2222, according to an embodiment, for receiving a data field of a PPDU including mid-ambles. The process 2222 may be performed in S2122 of the process 2100 of FIG. 21.

At S2202, the process 2222 initializes a loop counter $N_{MA}$ to 1. At S2204, the process 2222 receives an $N^{th}$ plurality of consecutive data symbols, wherein the number of data symbols in each plurality of consecutive data symbols equals the mid-amble periodicity M.

At S2206, the process 2222 receives an $N^{th}$ mid-amble. At S2208, the process 2222 increments the loop counter $N_{MA}$ by 1.

At S2210, in response to the loop counter $N_{MA}$ having a value less than or equal to a value of the number of mid-ambles $N_{MA}$ M, the process 2222 proceeds to S2204; otherwise at S2210 the process 2222 proceeds to S2212.

At S2212, the process 2222 receives the remaining data symbols. The number of remaining data symbols may be determined according to Equation 82, above.

The solutions provided herein have been described with reference to a wireless LAN system; however, it should be understood that these solutions may also be applicable to other network environments, such as cellular telecommunication networks, wired networks, and so on.

The above explanation and figures are applied to an HE station, an HE frame, an HE PPDU, an HE-SIG field and the like of the IEEE 802.11ax amendment, but they can also applied to a receiver, a frame, PPDU, a SIG field, and the like of another future amendment of IEEE 802.11.

Embodiments of the present disclosure include electronic devices configured to perform one or more of the operations described herein. However, embodiments are not limited thereto.

Embodiments of the present disclosure may further include systems configured to operate using the processes described herein. The systems may include basic service sets (BSSs) such as the BSSs 100 of FIG. 1, but embodiments are not limited thereto.

Embodiments of the present disclosure may be implemented in the form of program instructions executable through various computer means, such as a processor or microcontroller, and recorded in a non-transitory computer-readable medium. The non-transitory computer-readable medium may include one or more of program instructions, data files, data structures, and the like. The program instructions may be adapted to execute the processes and to generate and decode the frames described herein when executed on a device such as the wireless devices shown in FIG. 1.

In an embodiment, the non-transitory computer-readable medium may include a read only memory (ROM), a random access memory (RAM), or a flash memory. In an embodiment, the non-transitory computer-readable medium may include a magnetic, optical, or magneto-optical disc such as a hard disk drive, a floppy disc, a CD-ROM, and the like.

In some cases, an embodiment of the invention may be an apparatus (e.g., an AP station, a non-AP station, or another network or computing device) that includes one or more hardware and software logic structure for performing one or more of the operations described herein. For example, as described above, the apparatus may include a memory unit, which stores instructions that may be executed by a hardware processor installed in the apparatus. The apparatus may also include one or more other hardware or software elements, including a network interface, a display device, etc.

While this invention has been described in connection with what is presently considered to be practical embodiments, embodiments are not limited to the disclosed embodiments, but, on the contrary, may include various modifications and equivalent arrangements included within the spirit and scope of the appended claims. The order of operations described in a process is illustrative and some operations may be re-ordered. Further, two or more embodiments may be combined.

What is claimed is:

1. A method performed by a wireless device, the method comprising:
    receiving a first portion of a PHY Protocol Data Unit (PPDU), the first portion including a Legacy Signal (L-SIG) field;
    decoding the L-SIG field;
    determining a format of the PPDU using the first portion; and
    in response to determining that the format of the PPDU is a High Efficiency (HE) format:
        receiving and decoding an HE Signal A (HE-SIG-A) field,
        determining, using a Doppler field of the HE-SIG-A field, whether the PPDU includes mid-ambles, and
    in response to determining that the PPDU includes mid-ambles:
        determining, according to the format of the PPDU and using first information determined using the HE-SIG-A field and second information determined using the L-SIG field, a number of mid-ambles $N_{MA}$ indicating a total number of mid-ambles included in a data field of the PPDU;
        determining, using the number of the mid-ambles $N_{MA}$, a number of data symbols $N_{SYM}$ indicating a total number of data symbols included in the data field of the PPDU; and
        receiving, using the number of mid-ambles $N_{MA}$ and the number of data symbols $N_{SYM}$, the data field of the PPDU.

2. The method of claim 1, wherein the first information includes a Packet Extension (PE) Disambiguity bit value $b_{PE\text{-}Disambiguity}$, a number of HE Long Training Fields (HE-LTFs) value $N_{HE\text{-}LTF}$, an HE-LTF duration including guard interval $T_{HE\text{-}LTF}$, and a data symbol duration $T_{SYM}$, and a mid-amble periodicity M.

3. The method of claim 2, wherein the first information further includes a preamble duration $T_{PA}$ according to the format of the PPDU, the HE-LTF duration $T_{HE\text{-}LTF}$, and the number of HE-LTFs value $N_{HE\text{-}LTF}$.

4. The method of claim 3, wherein the first information further includes a mid-amble duration $T_{MA}$.

5. The method of claim 4, wherein the second information includes a Length field value L_LENGTH.

6. The method of claim 5, wherein determining the number of mid-ambles $N_{MA}$ includes determining the number of mid-ambles $N_{MA}$ according to:

$$N_{MA} = \left\lfloor \frac{\frac{L\_LENGTH + m + 3}{3} \times 4 - T_{PA} - T_{SYM}(1 + \beta + b_{PE\text{-}Disambiguity})}{T_{MA} + M \cdot T_{SYM}} \right\rfloor$$

wherein m is 1 when the format of the PPDU is an HE Multi-User PPDU or HE Extended Range Single User PPDU format and m is 2 otherwise, and wherein β is an integer number greater than or equal to zero.

7. The method of claim 6, wherein β is 1.

8. The method of claim 5, wherein determining the number of mid-ambles $N_{MA}$ includes determining the number of mid-ambles $N_{MA}$ according to:

$$N_{MA} = \left\lceil \frac{\frac{L\_LENGTH + m + 3}{3} \times 4 - T_{PA} - T_{SYM}(1 + \beta + b_{PE\text{-}Disambiguity} + M)}{T_{MA} + M \cdot T_{SYM}} \right\rceil$$

wherein m is 1 when the format of the PPDU is an HE Multi-User PPDU or HE Extended Range Single User PPDU format and m is 2 otherwise, and wherein β is an integer number greater than or equal to zero.

9. The method of claim 8, wherein β is 1.

10. The method of claim 1, wherein receiving the data field comprises:
    repeating, a number of times equal to the number of mid-ambles $N_{MA}$:

receiving a plurality of consecutive data symbols, wherein the number of data symbols in the plurality of data symbols is equal to the mid-amble periodicity M, and receiving a mid-amble immediately following the plurality of consecutive data symbols; and receiving a remaining 0 or more remaining consecutive data symbols, wherein the number of data symbols $N_{remain}$ is equal to:

$N_{remain} = N_{SYM} - (M \cdot N_{MA})$.

11. A wireless device comprising:
a receiver; and
a processor, the processor configured to perform:
receiving, using the receiver, a first portion of a PHY Protocol Data Unit (PPDU), the first portion including a Legacy Signal (L-SIG) field;
decoding the L-SIG field;
determining a format of the PPDU using the first portion; and
in response to determining that the format of the PPDU is a High Efficiency (HE) format:
receiving and decoding an HE Signal A (HE-SIG-A) field,
determining, using a Doppler field of the HE-SIG-A field, whether the PPDU includes mid-ambles, and
in response to determining that the PPDU includes mid-ambles:
determining, according to the format of the PPDU and using first information determined using the HE-SIG-A field and second information determined using the L-SIG field, a number of mid-ambles $N_{MA}$ indicating a total number of mid-ambles included in a data field of the PPDU;
determining, using the number of the mid-ambles $N_{MA}$, a number of data symbols $N_{SYM}$ indicating a total number of data symbols included in the data field of the PPDU; and
receiving, using the number of mid-ambles $N_{MA}$ and the number of data symbols $N_{SYM}$, the data field of the PPDU.

12. The wireless device of claim 11, wherein the first information includes a Packet Extension (PE) Disambiguity bit value $b_{PE-Disambiguity}$, a number of HE Long Training Fields (HE-LTFs) value $N_{HE-LTF}$, an HE-LTF duration including guard interval $T_{HE-LTF}$, and a data symbol duration $T_{SYM}$, and a mid-amble periodicity M.

13. The wireless device of claim 12, wherein the first information further includes a preamble duration $T_{PA}$ according to the format of the PPDU, the HE-LTF duration $T_{HE-LTF}$, and the number of HE-LTFs value $N_{HE-LTF}$.

14. The wireless device of claim 13, wherein the first information further includes a mid-amble duration $T_{MA}$.

15. The wireless device of claim 14, wherein the second information includes a Length field value L_LENGTH.

16. The wireless device of claim 15, wherein determining the number of mid-ambles $N_{MA}$ includes determining the number of mid-ambles $N_{MA}$ according to:

$$N_{MA} = \left\lfloor \frac{\frac{L\_LENGTH + m + 3}{3} \times 4 - T_{PA} - T_{SYM}(1 + \beta + b_{PE-Disambiguity})}{T_{MA} + M \cdot T_{SYM}} \right\rfloor$$

wherein m is 1 when the format of the PPDU is an HE Multi-User PPDU or HE Extended Range Single User PPDU format and m is 2 otherwise, and
wherein $\beta$ is an integer number greater than or equal to zero.

17. The wireless device of claim 16, wherein $\beta$ is 1.

18. The wireless device of claim 15, wherein determining the number of mid-ambles $N_{MA}$ includes determining the number of mid-ambles $N_{MA}$ according to:

$$N_{MA} = \left\lceil \frac{\frac{L\_LENGTH + m + 3}{3} \times 4 - T_{PA} - T_{SYM}(1 + \beta + b_{PE-Disambiguity} + M)}{T_{MA} + M \cdot T_{SYM}} \right\rceil$$

wherein m is 1 when the format of the PPDU is an HE Multi-User PPDU or HE Extended Range Single User PPDU format and m is 2 otherwise, and
wherein $\beta$ is an integer number greater than or equal to zero.

19. The wireless device of claim 18, wherein $\beta$ is 1.

20. The wireless device of claim 11, wherein receiving the data field comprises:
repeating, a number of times equal to the number of mid-ambles $N_{MA}$:
receiving a plurality of consecutive data symbols, wherein the number of data symbols in the plurality of data symbols is equal to the mid-amble periodicity M, and
receiving a mid-amble immediately following the plurality of consecutive data symbols; and
receiving a remaining 0 or more remaining consecutive data symbols, wherein the number of data symbols $N_{remain}$ is equal to:

$N_{remain} = N_{SYM} - (M \cdot N_{MA})$.

* * * * *